US010308776B2

(12) United States Patent
Fiscus et al.

(10) Patent No.: US 10,308,776 B2
(45) Date of Patent: Jun. 4, 2019

(54) POLYETHYLENE FILMS AND METHOD OF MAKING SAME

(71) Applicant: ExxonMobil Chemical Patents Inc., Baytown, TX (US)

(72) Inventors: David Michael Fiscus, Houston, TX (US); Danny Van Hoyweghen, Heverlee (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 29 days.

(21) Appl. No.: 14/649,834

(22) PCT Filed: Dec. 4, 2013

(86) PCT No.: PCT/US2013/072947
§ 371 (c)(1),
(2) Date: Jun. 4, 2015

(87) PCT Pub. No.: WO2014/099356
PCT Pub. Date: Jun. 26, 2014

(65) Prior Publication Data
US 2015/0368415 A1 Dec. 24, 2015

Related U.S. Application Data

(60) Provisional application No. 61/738,813, filed on Dec. 18, 2012.

(51) Int. Cl.
B29L 7/00 (2006.01)
B29L 9/00 (2006.01)
C08J 5/18 (2006.01)
B29C 48/08 (2019.01)
B29C 48/21 (2019.01)
B32B 27/32 (2006.01)

(52) U.S. Cl.
CPC ............... *C08J 5/18* (2013.01); *B29C 48/08* (2019.02); *B29C 48/21* (2019.02); *B32B 27/32* (2013.01); *B32B 27/327* (2013.01); *B29K 2023/06* (2013.01); *B29K 2995/0064* (2013.01); *B29K 2995/0081* (2013.01); *B29L 2007/00* (2013.01); *B29L 2009/00* (2013.01); *B32B 2270/00* (2013.01); *B32B 2307/558* (2013.01); *B32B 2307/5825* (2013.01); *B32B 2307/72* (2013.01); *C08J 2323/06* (2013.01); *C08J 2323/08* (2013.01); *Y10T 428/269* (2015.01)

(58) Field of Classification Search
CPC ..... C08J 5/18; C08J 2323/08; Y10T 428/269; B29C 2023/0625; B29C 47/0054; B29C 47/0057; B29C 47/20; B29C 47/22; B29C 47/26; B29C 47/88; B29C 47/882; B29C 47/8825; B29C 47/883; B29C 47/8835; B29C 47/902; B29C 47/903; B29C 49/08; B29C 47/0009; B29C 55/28; B29C 47/0021; B29C 47/065; B29C 47/901; B29K 2105/0014; B29K 2995/0064; B29K 2995/0081; B29K 2023/06; B32B 27/32; B32B 27/327; B32B 2307/72; B32B 2307/558; B32B 2270/00; B32B 2307/5825; B29L 2007/00; B29L 2009/00
See application file for complete search history.

(56) References Cited

U.S. PATENT DOCUMENTS

| | | | |
|---|---|---|---|
| 3,248,179 A | 4/1966 | Norwood | |
| 4,543,399 A | 9/1985 | Jenkins, III et al. | |
| 4,588,790 A | 5/1986 | Jenkins, III et al. | |
| 4,613,484 A | 9/1986 | Ayres et al. | |
| 5,028,670 A | 7/1991 | Chinh et al. | |
| 5,317,036 A | 5/1994 | Brady, III et al. | |
| 5,352,749 A | 10/1994 | DeChellis et al. | |
| 5,405,922 A | 4/1995 | DeChellis et al. | |
| 5,436,304 A | 7/1995 | Griffin et al. | |
| 5,453,471 A | 9/1995 | Bernier et al. | |
| 5,462,999 A | 10/1995 | Griffin et al. | |
| 5,466,649 A | 11/1995 | Jejelowo | |
| 5,616,661 A | 4/1997 | Eisinger et al. | |
| 5,627,242 A | 5/1997 | Jacobsen et al. | |
| 5,665,818 A | 9/1997 | Tilston et al. | |
| 5,668,228 A | 9/1997 | Chinh et al. | |
| 5,677,375 A | 10/1997 | Rifi et al. | |
| 5,741,563 A | 4/1998 | Mehta et al. | |
| 6,225,426 B1 | 5/2001 | Gillis et al. | |
| 6,242,545 B1 | 6/2001 | Jejelowo et al. | |
| 6,248,845 B1 | 6/2001 | Loveday et al. | |
| 6,342,566 B2 | 1/2002 | Burkhardt et al. | |
| 6,384,142 B1 | 5/2002 | Burkhardt et al. | |
| 6,476,171 B1 | 11/2002 | Lue et al. | |
| 6,956,088 B2 | 10/2005 | Farley et al. | |
| 7,157,531 B2* | 1/2007 | Szul .................. | C08F 210/16 526/160 |
| 7,951,873 B2 | 5/2011 | Best et al. | |
| 8,722,833 B2* | 5/2014 | Kipke .................. | 502/102 |
| 2004/0077810 A1* | 4/2004 | Marechal ............ | B32B 27/32 526/183 |
| 2005/0058847 A1* | 3/2005 | Szul .................... | C08F 10/00 428/523 |

(Continued)

FOREIGN PATENT DOCUMENTS

EP 0802202 5/1994
EP 0634421 7/1994
(Continued)

OTHER PUBLICATIONS

Resconi et al., "Selectivity in Propene Polymerization with Metallocene Catalysts," Chemical Review, vol. 100, pp. 1253-1345 (2000).

(Continued)

Primary Examiner — Jeffrey M Wollschlager

(57) ABSTRACT

The present invention is directed to polyethylene films having improved properties. Particularly, relatively thick films having improved tear properties and methods of improving tear, and multilayer films having improved dart impact strength and methods of improving the Dart impact strength.

20 Claims, No Drawings

(56) References Cited

U.S. PATENT DOCUMENTS

| | | | | |
|---|---|---|---|---|
| 2008/0118749 | A1* | 5/2008 | Aubee | B32B 27/32 428/340 |
| 2008/0226920 | A1* | 9/2008 | Parkinson | B32B 27/08 428/411.1 |
| 2009/0156764 | A1* | 6/2009 | Malakoff | B29C 47/009 526/170 |
| 2009/0192270 | A1* | 7/2009 | Malakoff | C08L 23/0815 525/240 |
| 2009/0297810 | A1* | 12/2009 | Fiscus | B32B 27/32 428/220 |
| 2010/0298508 | A1* | 11/2010 | Michie | C08F 210/16 526/90 |
| 2011/0039082 | A1* | 2/2011 | Yun | C08J 5/18 428/213 |
| 2011/0165395 | A1* | 7/2011 | Van Hoyweghen | B32B 27/08 428/218 |
| 2012/0101235 | A1* | 4/2012 | Crowther | C08F 210/16 525/319 |
| 2012/0238720 | A1* | 9/2012 | Lam | C08F 10/00 526/348.3 |
| 2012/0288651 | A1* | 11/2012 | Pettey | B29C 47/0004 428/35.7 |
| 2014/0128563 | A1* | 5/2014 | McDaniel | C08F 210/14 526/348.5 |
| 2015/0240000 | A1* | 8/2015 | Wang | C08L 23/0815 525/240 |

FOREIGN PATENT DOCUMENTS

| | | |
|---|---|---|
| EP | 0794200 | 3/1997 |
| WO | 93/03093 | 2/1993 |
| WO | 96/08520 | 3/1996 |
| WO | 97/19991 | 6/1997 |
| WO | 98/44011 | 10/1998 |
| WO | 03/040201 | 5/2003 |

OTHER PUBLICATIONS

Scholte et al., "*Mark-Houwink Equation and GPC Calibration for Linear Short-Chain Branched Polyolefins, Including Polypropylene and Ethylene-Propylene Copolymers*," Journal of Applied Polymer Science, vol. 29, pp. 3763-3782 (1984).

Suzuki et al., "*Radiation-Induced Emulsion Copolymerization of Tetrafluoroethylene with Propylene. The Behavior of the HF Formed*," Journal of Macromolecular Science—Chemistry, vol. A9(2), pp. 285-297 (1975).

Wood-Adams et al., "*Effect of Molecular Structure on the Linear Viscoelastic Behavior of Polyethylene*," Macromolecules, vol. 33 pp. 7489-7499 (2000).

\* cited by examiner

POLYETHYLENE FILMS AND METHOD OF MAKING SAME

CROSS-REFERENCE OF RELATED APPLICATIONS

This application is a National Stage Application of International Application No. PCT/US2013/072947, filed Dec. 4, 2013, which claims the benefit of Ser. No. 61/738,813, filed Dec. 18, 2012, the disclosures of which are incorporated by reference in their entireties.

FIELD OF THE INVENTION

The present invention is directed to monolayer and multilayer polyethylene films having improved properties.

BACKGROUND OF THE INVENTION

Polyethylene polymers, blends thereof with other polymers, and articles made therefrom are generally known in the art. Many varieties of polyethylene polymers have been prepared over the years, including those made using high pressure free radical chemistry (LDPE), traditional linear low density polyethylene (LLDPE) typically made using Ziegler-Natta processes, and polyethylene made by metallocene or other catalysts. Generally, polyethylenes made by different processes have different molecular architectures and distribution characteristics giving rise to varying positives and negatives, depending on application or end-use.

One way to categorize polyethylene polymers is based on the presence, amount, and character of long-chain branching in the distribution of polymer molecules. Generally, long-chain branches are those branches longer than branches resulting from direct incorporation of monomer. Another feature of polyethylenes is the distribution of short chain branches. Some polyethylenes have a relatively uniform comonomer architecture. Thus, such polyethylenes have a comonomer content that is relatively constant over the distribution of molecular weights in the composition. In other words, such polyethylenes can be said to have a relatively low percentage of molecules having a comonomer content within 50% of the median total molar comonomer content. Others polyethylenes have a narrow distribution of comonomer incorporation as reflected by a relatively high percentage of molecules having a comonomer content within 50% of the median total molar comonomer content. In addition to the relative breadth in the distribution of the comonomer branches over the molecular weight range, polyethylenes can be differentiated based on the relative molecular regime into which the comonomer branches incorporate. Thus, in some polyethlyenes, the comonomer may be preferentially incorporated in lower molecular weight molecules. In others, the comonomer branches are more concentrated in higher molecular weight molecules. While each of these features is generally known, the particular combinations of these and other features that may lead to unique property combinations suitable for particular uses is difficult to predict.

Polyethylene having certain combinations of such properties that lead to improved properties and versatility in film applications is still needed to meet performance and application targets.

SUMMARY OF THE INVENTION

In one aspect, embodiments described herein provide a film having a thickness of about 20.0 to about 100.0 μm, film comprising at least a Layer A comprising:

a) 50.0 to 100.0 wt. %, based on the weight of Layer A, of a first PE3-type polyethylene having a hafnium: zirconium (ppm/ppm) ratio >1.0, a CDBI <50%, and a $g'_{vis} \geq 0.98$, and b) optionally, 1.0 to 50.0 wt. % of a polymer component selected from the group consisting of: i) a PE4-type polyethylene, ii) a PE5-type polyethylene, iii) a second PE3-type polyethylene, different from the first PE3-type polyethylene, having a density greater than 0.945 g/cm$^3$, iv) a propylene-based polymer; and v) combinations thereof, the film having an MD Elmendorf Tear of 500.0 to about 1000.0 g/mil.

In another aspect, embodiments described herein provide a method of improving the MD Elmendorf Tear of a film having a thickness of about 20.0 to about 100.0 μm, the method comprising:

a) providing a monolayer extrudate consisting essentially of a first polyethylene having a hafnium: zirconium (ppm/ppm) ratio ≥2.0, a CDBI <50%, and a $g'_{vis} \geq 0.98$, a hafnium concentration >5.0 ppm; a melt index of from about 0.1 g/10 min to about 5.0 g/10 min; a melt index ratio of from about 18 to about 30; a weight average molecular weight ($M_w$) of from about 20,000 to about 200,000 g/mol; a molecular weight distribution ($M_w/M_n$) of from about 2.0 to about 4.5; and a density of from 0.910 to 0.960 g/cm$^3$; and b) forming the extrudate into a film at a rate of throughput ≥10 lbs/hour-inch of die; orienting the film at a blow-up ratio ≥1.2, at a frost line height of 20.0 to 40.0 in.

In yet another aspect, embodiments described herein provide a method of improving the MD Elmendorf Tear strength of a film having a thickness of about 20.0 to about 100.0 μm, the method comprising:

a) providing a Layer A, the Layer A comprising: i) 50.0 to 100.0 wt. %, based on the weight of Layer A, of a first PE3-type polyethylene having a hafnium: zirconium (ppm/ppm) ratio >1.0, a CDBI <50%, and a $g'_{vis} \geq 0.98$, and ii) optionally, 1.0 to 50.0 wt. % of a polymer component selected from the group consisting of: i) high-pressure polyethylene homopolymers or copolymer, ii) a heterogeneously branched ethylene homopolymer or copolymer polymer having polymer units derived from at least one $C_3$ to $C_{20}$ alpha-olefin and having a CBDI <50.0%, iii) a second PE3-type polyethylene, different from the first PE3-type polyethylene, having a density greater than 0.945 g/cm$^3$, iv) a propylene-based polymer, and v) combinations thereof; and b) optionally providing a Layer B in surface contact with a first surface of Layer A; c) further optionally providing a Layer C in surface contact with a second surface of Layer A, and d) orienting the film to provide an MD Elmendorf Tear of 500.0 to about 1000.0 g/mil.

Still other embodiments provide a method of improving the Dart A impact strength of a multilayer film, said method comprising providing a Layer A, the Layer A comprising:

a) about 5.0 to about 35.0 wt. % of a first PE1-type having a $g'_{vis} \leq 0.97$; 0.05 to 0.5 long-chain branches per/1000 C atoms, a density of 0.920 to 0.935 g/cm$^3$, and a melt index of 0.1 to 0.5 g/10 min; and b) 95.0 to 65.0 wt. % of a second polyethylene, based on the total weight of Layer A, wherein the Dart A impact strength of the multilayer film is at least 50.0% greater than the Dart A impact strength of a comparable multilayer film.

Further particular embodiments provide a method of improving the Dart A impact strength of a co-extruded, blown multilayer film, said method comprising:

a) providing a Layer A comprising: i) about 5.0 to about 35.0 wt. % of a first polyethylene having a $g'_{vis}$ ≤0.97; 0.05 to 0.5 long-chain branches per/1000C atoms, a density of 0.920 to 0.935 g/cm$^3$, and a melt index of 0.1 to 0.5 g/10 min; and ii) 95.0 to 65.0 wt. % of a second polyethylene comprising ≥50.0 wt. % polymer units derived from ethylene and ≤50 wt. % polymer units derived from a $C_3$ to $C_{20}$ comonomer, based upon the weight of the second polyethylene, wherein the second polyethylene has a CDBI ≥60%, a density of 0.910 to 0.950 g/cm$^3$ and a $g'_{vis}$ ≥0.98.; wt. % values based on the total weight of Layer A, b) providing a Layer B in surface contact with a first surface of Layer A, the Layer B comprising: i) 80.0 to 100.0 wt. % of a third polyethylene, wherein the third polyethylene comprises ≥50.0 wt. % polymer units derived from ethylene and ≤50 wt. % polymer units derived from a $C_3$ to $C_{20}$ comonomer, based upon the weight of the third polyethylene, wherein the third polyethylene has a CDBI ≥60%, a density of 0.910 to 0.950 g/cm$^3$ and a $g'_{vis}$ ≥0.98.; and ii) 0.0 to 20.0 wt. % of a fourth polyethylene, wt. % values based on the total weight of the Layer B; and c) providing a Layer C in surface contact with a second surface of Layer A, the Layer C comprising: i) 80.0 to 100.0 wt. % of a fifth polyethylene, wherein the fifth ethylene-based polymer comprises≥50.0 wt. % polymer units derived from ethylene and ≤50 wt. % polymer units derived from a $C_3$ to $C_{20}$ comonomer, based upon the weight of the fifth polyethylene, wherein the fifth polyethylene has a CDBI ≥60%, a density of 0.910 to 0.950 g/cm$^3$ and a $g'_{vis}$ ≥0.98.; wt. % values based on the total weight of the Layer C; and ii) 0.0 to 20.0 wt. % of a sixth polyethylene, wt. % values based on the total weight of the Layer C; wherein each of the third, fourth, fifth and sixth polyethylene may be the same or different, wherein the Dart A impact strength of the film is at least 50.0% greater than the Dart A impact strength of a comparable film, wherein the Dart A impact strength is 1200.0 to 1600.0 g/mil.

Still further particular embodiments provide a method of improving the Dart A impact strength of a co-extruded, blown multilayer film, said method comprising:

a) providing a Layer A comprising: i) about 5.0 to about 35.0 wt. % of a first polyethylene having a $g'_{vis}$ ≤0.97; 0.05 to 0.5 long-chain branches per/1000C atoms; a density of 0.920 to 0.935 g/cm$^3$, and a melt index of 0.1 to 0.5 g/10 min; and ii) 95.0 to 65.0 wt. % of a second polyethylene having a $g'_{vis}$ of 0.97 or less; 0.05 to 0.5 long-chain branches per/1000C atoms; a density of 0.910 to 0.930 g/cm$^3$, and iv) a melt index of 0.5 to 1.5 g/10 min; wt. % values based on the total weight of Layer A, b) providing a Layer B in surface contact with a first surface of Layer A, the Layer B comprising: i) 80.0 to 100.0 wt. % of a third polyethylene, wherein the third ethylene-based polymer has a $g'_{vis}$ of 0.97 or less; 0.05 to 0.5 long-chain branches per/1000C atoms; a density of 0.910 to 0.930 g/cm$^3$ and a melt index of 0.5 to 1.5 g/10 min; and ii) 0.0 to 20.0 wt. % of a fourth polyethylene, wt. % values based on the total weight of the Layer B; and c) providing a Layer C in surface contact with a second surface of Layer A, the Layer C comprising: i) 80.0 to 100.0 wt. % of a fifth polyethylene, wherein the fifth polyethylene has a $g'_{vis}$ of 0.97 or less; 0.05 to 0.5 long-chain branches per/1000C atoms; a density of 0.910 to 0.930 g/cm$^3$ and a melt index of 0.5 to 1.5 g/10 min; all wt. % values are based on the total weight of the Layer C; and ii) 0.0 to 20.0 wt. % of a sixth polyethylene, wt. % values based on the total weight of the Layer C, wherein each of the third, fourth, fifth and sixth ethylene-based polymers may be the same or different, wherein the Dart A impact strength of the film is at least 50.0% greater than the Dart A impact strength of a comparable film, wherein the Dart A impact strength is 250.0 to 400.0 g/mil.

Yet further particular embodiments provide a method of improving the Dart A impact strength of a co-extruded, blown multilayer film, said method comprising:

a) providing a Layer A comprising about 5.0 to about 35.0 wt. % of a first polyethylene having a $g'_{vis}$ ≤0.97, 0.05 to 0.5 long-chain branches per/1000C atoms, a density of 0.920 to 0.935 g/cm$^3$, and a melt index of 0.1 to 0.5 g/10 min; and ii) 95.0 to 65.0 wt. % of a second polyethylene having a hafnium: zirconium (ppm/ppm) ratio greater than 1.0, a CDBI <50%, and a $g'_{vis}$ ≥0.98.; wt. % values based on the total weight of Layer A, b) providing a Layer B in surface contact with a first surface of Layer A, the Layer B comprising: i) 80.0 to 100.0 wt. % of a third polyethylene, wherein the third ethylene-based polymer has a hafnium: zirconium (ppm/ppm) ratio greater than 1.0, a CDBI <50%, and a $g'_{vis}$ ≥0.98.; and ii) 0.0 to 20.0 wt. % of a fourth polyethylene, wt. % values based on the total weight of the Layer B; and c) providing a Layer C in surface contact with a second surface of Layer A, the Layer C comprising: i) 80.0 to 100.0 wt. % of a fifth polyethylene, wherein the fifth polyethylene has a hafnium: zirconium (ppm/ppm) ratio greater than 1.0, a CDBI <50%, and a $g'_{vis}$ ≥0.98.; all wt. % values are based on the total weight of the Layer C; and ii) 0.0 to 20.0 wt. % of a sixth polyethylene, wt. % values based on the total weight of the Layer C; wherein each of the third, fourth, fifth and sixth ethylene-based polymers may be the same or different, wherein the Dart A impact strength of the film is at least 50.0% greater than the Dart A impact strength of a comparable film, wherein the Dart A impact strength is 750.0 to 1000.0 g/mil.

Films and articles made by these methods are also described.

DETAILED DESCRIPTION

Embodiments described herein provide relatively thick films (i.e., greater than 20.0 μm) having an improved MD Elmendorf Tear. In particular, relatively thick blown films having an MD Tear greater than 20.0 g/μm are provided.

In the following description, all numbers disclosed herein are approximate values, regardless whether the word "about" or "approximate" is used in connection therewith. They may vary by 1%, 2%, 5%, and sometimes, 10 to 20%. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1% to 100% with a 1% increment, i.e., k is 1%, 2%, 3%, 4%, 5%, . . . , 50%, 51%, 52%, . . . , 95%, 96%, 97%, 98%, 99%, or 100%. Moreover, any numerical range defined by two R numbers as defined in the above is also specifically disclosed.

Unless stated otherwise, all weight percentages of components in a film layer are based on the total weight of the total weight of the respective film layer.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to ethylene, hexene, and diene, the olefin present in such polymer or copolymer is the polymerized form of the olefin. For example, when a copolymer is said to have an "ethylene" content of 35 wt. % to 55 wt. %, it is understood that the mer unit in the copolymer is derived from ethylene in the polymerization reaction and said derived units are present at 35 wt. % to 55 wt. %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. The term "different" as used to refer to mer units indicates that the mer units differ from each other by at least one atom or are different isomerically. Accordingly, the definition of copolymer, as used herein, includes terpolymers, and the like. Likewise, the definition of polymer, as used herein, includes copolymers, and the like. Thus, as used herein, the terms "polyethylene," "ethylene polymer," "ethylene copolymer," and "ethylene based polymer" means a polymer or copolymer comprising at least 50.0 mol % ethylene units (preferably at least 70.0 mol % ethylene units, more preferably at least 80.0 mol % ethylene units, even more preferably at least 90.0 mol % ethylene units, even more preferably at least 95.0 mol % ethylene units or 100.0 mol % ethylene units (in the case of a homopolymer)). Furthermore, the term "polyethylene composition" means a blend containing one or more polyethylene components.

The term "film" of the invention typically refers to blown films having multiple layers (multilayer films). When used in multilayer films, the various polyolefin resins described herein can be used in any layer of the film, or in more than one layer of the film, as desired. When more than one layer of the film is formed, each layer can be individually formulated; i.e., the layers formed of or including the polyethylene resin can have the same or different chemical composition, density, melt index, thickness, etc., depending upon the desired properties of the film.

To facilitate discussion of different film structures of the invention, the following notation is used herein. Each layer of a film is denoted "X" or "Y", where "X" indicates a conventional film layer, and "Y" indicates a different film layer. Where a film includes more than one X layer or more than one Y layer, one or more prime symbols (', ", "', etc.) are appended to the X or Y symbol to indicate layers of the same type (conventional or inventive) that can be the same or can differ in one or more properties, such as chemical composition, density, melt index, thickness, and the like, within the range of the parameters defined herein. Finally, the symbols for adjacent layers are separated by a slash (/). Using this notation, a three-layer film having an inner layer, which is also referred to herein as a "core layer" disposed between two outer film layers, the layers would be denoted X/Y/X'. Similarly, a five-layer film of alternating layers would be denoted X/Y/X'/Y'/X". Unless otherwise indicated, the left-to-right or right-to-left order of layers does not matter, nor does the order of prime symbols; e.g., an X/Y film is equivalent to a B/A film, and an X/X'/Y/X" film is equivalent to an X/Y/X'/X" film, for purposes of the present invention. The relative thickness of each film layer is similarly denoted, with the thickness of each layer relative to a total film thickness of 100 (dimensionless) is indicated numerically and separated by slashes; e.g., the thickness of an X/Y/X' film having X and X' layers of 10 μm each and a Y layer of 30 μm is denoted as 20/60/20.

The term "blown film" may include uniaxially, biaxially, and un-oriented multi-layer films. Orientation in the direction of extrusion is known as machine direction (MD) orientation. Orientation perpendicular to the direction of extrusion is known as transverse direction (TD) orientation. The film may be oriented to the same or different extent in each direction. Orientation may be accomplished by stretching a film first in the MD followed by TD orientation, by stretching in the TD followed by stretching in the MD, or by stretching in both MD and TD simultaneously.

PE1-Type Polyethylene

Polyethylenes described herein as PE1-type polyethylenes are polyethylene copolymers having about 99.0 to about 80.0 wt. %, 99.0 to 85.0 wt. %, 99.0 to 87.5 wt. %, 99.0 to 90.0 wt. %, 99.0 to 92.5 wt. %, 99.0 to 95.0 wt. %, or 99.0 to 97.0 wt. %, of polymer units derived from ethylene and about 1.0 to about 20.0 wt. %, 1.0 to 15.0 wt. %, 1.0 to 12.5 wt. %, 1.0 to 10.0 wt. %, 1.0 to 7.5 wt. %, 1.0 to 5.0 wt. %, or 1.0 to 3.0 wt. % of polymer units derived from one or more $C_3$ to $C_{20}$ α-olefin comonomers, preferably $C_3$ to $C_{10}$ α-olefins, and more preferably $C_4$ to $C_8$ α-olefins. The α-olefin comonomer may be linear or branched, and two or more comonomers may be used, if desired. Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include 1-butene, 1-hexene, and 1-octene, 1-hexene being most preferred.

Typically, PE1-type polyethylenes also have a Composition Distribution Breadth Index (CDBI) of at least 70%, preferably ≥80.0%, preferably ≥85.0%, preferably ≥90.0%; e.g., 70.0 to 98%, 80.0 to 95.0%, or 85.0 to 90.0%.

PE1-type polyethylenes preferably have a melt index, $I_{2.16}$, of about 0.05 to about 0.5 g/10 min, particularly 0.1 to 0.1 g/10 min, or 0.3 to 0.8 g/10 min, more particularly 0.4 to 0.6 g/10 min, as determined in accordance with ASTM D-1238 under a load of 2.16 kg and at a temperature of 190° C.

Particular PE1-type polyethylenes have a density of from about 0.910 to about 0.940 g/cm³; more particularly of 0.915 to 0.925 g/cm³, or of 0.918 to 0.922 g/cm³.

Typically, although not necessarily, PE1-type polyethylenes have a molecular weight distribution (MWD, defined as $M_w/M_n$) of about 2.5 to about 5.5, preferably 4.0 to 5.0.

PE1-type polyethylenes may also be characterized by an averaged 1% secant modulus (M) of from 10,000 to 60,000 psi (pounds per square inch), and a relation between M and the dart drop impact strength in g/mil (DIS) complying with formula (A):

$$DIS \geq 0.8 * [100 + e^{(11.71 - 0.000268M + 2.183 \times 10^{-9} M^2)}], \quad (A)$$

where "e" represents 2.7183, the base Napierian logarithm, M is the averaged modulus in psi, and DIS is the 26 inch dart impact strength. The DIS is preferably from about 120 to about 1000 g/mil, even more preferably, from about 150 to about 800 g/mil.

The relationship of the Dart Impact Strength to the averaged 1% secant modulus is thought to be an indicator of long-chain branching in the ethylene-based polymer. Thus, alternatively PE1-type polyethylenes may be characterized as having long-chain branches. Long-chain branches for the purposes of this invention represent the branches formed by reincorporation of vinyl-terminated macromers, not the branches formed by incorporation of the comonomers. The number of carbon atoms on the long-chain branches ranges from a chain length of at least one carbon more than two carbons less than the total number of carbons in the comonomer to several thousands. For example, a long-chain branch of an ethylene/hexene PE1-type polyethylene is at least five (5) carbons in length (i.e., 6 carbons less 2 equals 4 carbons plus one equals a minimum branch length of five carbons for long-chain branches). Particular PE1-type polyethylenes have a 0.05 to 1.0, particularly 0.05 to 0.5, 0.1 to 0.4, or 0.2 to 0.3, long-chain branches per 1000 carbon atoms. PE1-type polyethylenes having levels of long-chain branching greater than 1.0 long-chain branch per 1000 carbon atoms may have some beneficial properties, e.g., improved processability, shear thinning, and/or delayed melt fracture, and/or improved melt strength.

Typically, such polyethylenes have a branching index, $g'_{vis}$, of 0.85 to 0.98, particularly, 0.87 to 0.97, 0.89 to 0.97, 0.91 to 0.97, or 0.93 to 0.95.

PE1-type polyethylenes may be made by any suitable polymerization method (including solution or slurry polymerization methods) may be used, second ethylene-based polymers of the present invention may be readily obtained via a continuous gas phase polymerization using supported catalyst comprising an activated molecularly discrete catalyst in the substantial absence of an aluminum alkyl based scavenger (e.g., triethylaluminum (TEAL), trimethylaluminum (TMAL), triisobutyl aluminum (TIBAL), tri-n-hexylaluminum (TNHAL), and the like).

Zirconium transition metal metallocene-type catalyst systems are particularly suitable. Non-limiting examples of metallocene catalysts and catalyst systems useful in practicing the present invention include those described in U.S. Pat. Nos. 5,466,649, 6,476,171, 6,225,426, and 7,951,873, and in the references cited therein, all of which are fully incorporated herein by reference. Particularly useful catalyst systems include supported dimethylsilyl bis(tetrahydroindenyl) zirconium dichloride.

Supported polymerization catalyst may be deposited on, bonded to, contacted with, or incorporated within, adsorbed or absorbed in, or on, a support or carrier. In another embodiment, the metallocene is introduced onto a support by slurrying a presupported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. Very low solubilizing media such as mineral oil (e.g., Kaydo™ or Drakol™) or pentane may be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. The mixing time may be greater than 4 hours, but shorter times are suitable.

Typically, in a gas phase polymerization process, a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. The reactor pressure may vary from 100 psig (680 kPag)-500 psig (3448 kPag), or in the range of from 200 psig (1379 kPag)-400 psig (2759 kPag), or in the range of from 250 psig (1724 kPag)-350 psig (2414 kPag). The reactor operated at a temperature in the range of 60° C. to 120° C., 60° C. to 115° C., 70° C. to 110° C., 70° C. to 95° C., or 85° C. to 95° C. The productivity of the catalyst or catalyst system is influenced by the main monomer partial pressure. The mole percent of the main monomer, ethylene, is from 25.0-90.0 mole percent, or 50.0-90.0 mole percent, or 70.0-85.0 mole percent, and the monomer partial pressure is in the range of from 75 psia (517 kPa)-300 psia (2069 kPa), or 100-275 psia (689-1894 kPa), or 150-265 psia (1034-1826 kPa), or 200-250 psia (1378-1722 kPa), which are typical conditions in a gas phase polymerization process.

Other gas phase processes contemplated by the process of the invention include those described in U.S. Pat. Nos. 5,627,242, 5,665,818 and 5,677,375, and European Pat. Appls. EP-A-0 794 200, EP-A-0 802 202 and EP-B-0 634 421 all of which are herein fully incorporated by reference.

It may be beneficial in slurry or gas phase processes, to operate in the substantial absence of or essentially free of any scavengers, such as triethylaluminum, trimethylaluminum, triisobutylaluminum, and tri-n-hexylaluminum and diethyl aluminum chloride, and the like. Such processes are described in PCT Publication No. WO 96/08520, which is herein fully incorporated by reference.

Additionally, the use of a process continuity aid, while not required, may be desirable in any of the foregoing processes. Such continuity aids are well known to persons of skill in the art and include, for example, metal stearates.

PE1-type polyethylenes are commercially available from ExxonMobil Chemical Company as Enable™ mPEs. Such homogeneously branched long-chain branched linear polyethylenes may be made by the process described in WO 1998/44011 incorporated by reference for US purposes using a supported catalyst with a bridged bis-indenyl zirconocene transition metal component and methyl alumoxane cocatalyst. Lower melt index values can be reached by reducing the hydrogen level in the reactor while higher density can be obtained by reducing the level of hexene-1 comonomer using conventional process control techniques.

PE2-Type Polyethylene

Another type of polyethylene referred to hereafter as PE2-type polyethylene comprises ≥50.0 wt. % of polymer units derived from ethylene and ≤50.0 wt. % preferably 1.0 wt. % to 35.0 wt. %, even more preferably 1 wt. % to 6 wt. % of polymer units derived from a $C_3$ to $C_{20}$ alpha-olefin comonomer (preferably hexene or octene). PE2-type polyethylenes preferably have a Composition Distribution Breadth Index (CDBI) of 60.0% or more, preferably 60.0% to 80.0%, preferably 65.0% to 80.0%. The PE2-type polyethylene may have a density of 0.910 to 0.950 g/cm$^3$ (preferably 0.915 to 0.940 g/cm$^3$, preferably 0.918 to 0.925 g/cm$^3$) and a CDBI of 60.0% to 80.0%, preferably between 65% and 80%. PE2-type polyethylenes may have a melt index ($I_{2.16}$) according to ASTM D1238 (190° C./2.16 kg) of 0.5 to 5.0 g/10 min, particularly 0.8 to 1.5 g/10 min. Preferably, these polymers are metallocene polyethylenes (mPEs). PE2-type polyethylenes are available from ExxonMobil Chemical Company under the trade name Exceed™ mPEs. Such linear polyethylenes typically have a $g'_{vis} \geq 0.97$, preferably ≥0.98 and can be a prepared by gas-phase polymerization supported catalyst with an bridged bis(alkyl-substituted dicyclopentadienyl) zirconium dichloride transition metal component and methyl alumoxane cocatalyst.

PE3-Type Polyethylene

Yet another polyethylene useful in some embodiments is referred to hereafter as a PE3-type polyethylene. PE3-type polyethylenes have a 75.0 mole % to or 100.0 mole % of units derived from ethylene. The lower limit on the range of ethylene content may be 75.0 mole %, 80.0 mole %, 85.0 mole %, 90.0 mole %, 92.0 mole %, 94.0 mole %, 95.0 mole %, 96.0 mole %, 97.0 mole %, 98.0 mole %, 99.0 mole %, 99.5 mole %, or 100.0 mole % based on the mole % of polymer units derived from ethylene. PE3-type polyethylenes can have an upper limit on the range of ethylene content of 80.0 mole %, 85.0 mole %, 90.0 mole %, 92.0 mole %, 94.0 mole %, 95.0 mole %, 96.0 mole %, 97.0 mole %, 98.0 mole %, 99.0 mole %, 99.5 mole %, or 100.0 mole %, based on polymer units derived from ethylene. Such PE3-type polyethylenes less than 50.0 mole % of polymer units derived from a $C_3$ to $C_{20}$ olefin, preferably an alpha-olefin, most preferably hexene or octene. The lower limit on the range of $C_3$ to $C_{20}$ olefin-content may be 25.0 mole %, 20.0 mole %, 15.0 mole %, 10.0 mole %, 8.0 mole %, 6.0 mole %, 5.0 mole %, 4.0 mole %, 3.0 mole %, 2.0 mole %, 1.0 mole %, 0.5 mole %, or 0 mole %, based on polymer units derived from the $C_3$ to $C_{20}$ olefin. The upper limit on the range of $C_3$ to $C_{20}$ olefin-content may be 20.0 mole %, 15.0 mole %, 10.0 mole %, 8.0 mole %, 6.0 mole %, 5.0 mole %, 4.0 mole %, 3.0 mole %, 2.0 mole %, 1.0 mole %, 0.5 mole %, or 0 mole %, based on polymer units derived from the $C_3$ to $C_{20}$ olefin. In some embodiments, low $C_3$ to $C_{20}$-olefin contents, e.g., 0.0-5.0 mole % are preferred. Comonomer content is based on the total content of all monomers in the polymer.

Typically, PE3-type polymers have at least a first peak and a second peak in a comonomer distribution analysis, wherein the first peak has a maximum at a log($M_w$) value of 4.0 to 5.4, particularly 4.3 to 5.0, more particularly 4.5 to 4.7; and a TREF elution temperature of 70.0° C. to 100.0° C., particularly 80.0° C. to 95.0° C., more particularly 85.0° C. to 90.0° C. The second peak in the comonomer distribution analysis has a maximum at a log($M_w$) value of 5.0 to 6.0, particularly 5.3 to 5.7, more particularly 5.4 to 5.6; and a TREF elution temperature of 40.0° C. to 60.0° C., particularly 45.0° C. to 60.0° C., more particularly 48.0° C. to 54.0° C.

PE-3 type polymers suitable in embodiments of the invention having minimal long-chain branching (i.e., less than 1.0 long-chain branch/1000 carbon atoms, preferably particularly 0.05 to 0.50 long-chain branch/1000 carbon atoms). Such values are characteristic of a linear structure that is consistent with a branching index, $g'_{vis}$, ≥0.98. Some suitable polymer compositions have a $g'_{vis}$ ≥0.985, ≥0.99, ≥0.995, or 1.0. While such values are indicative of little to no long-chain branching, some long-chain branches may be present (i.e., less than 1.0 long-chain branch/1000 carbon atoms, preferably less than 0.5 long-chain branch/1000 carbon atoms, particularly 0.05 to 0.50 long-chain branch/1000 carbon atoms).

PE3-type polymers have a CDBI preferably less than 45%, particularly, less than 40.0%, or less than 35.0%. In one embodiment, the PE1-type polyethylenes polymer has a CDBI of from 20.0% to 35.0%. In another embodiment, the PE3-type polyethylene has a CDBI of from 25.0% to 28.0%. PE3-type polyethylenes may have an SDBI greater than 15° C., or greater than 16° C., or greater than 17° C., or greater than 18° C., or greater than 19° C., or greater than 20° C. In one embodiment, the polymers have a SDBI of from about 18° C. to about 22° C. In another embodiment, the polymers have a SDBI of from about 18.7° C. to about 21.4° C. In another embodiment, the polymers have a SDBI of from about 20° C. to about 22° C.

In some embodiments, PE3-type polyethylene has a density of about 0.912 to about 0.925 g/cm$^3$, from about 0.915 to about 0.921 g/cm$^3$, or about 0.916 to 0.918 g/cm$^3$.

The weight average molecular weight ($M_w$) of PE3-type polyethylenes may be from about 15,000 to about 250,000 g/mol. Preferably, the weight average molecular weight is from about 20,000 to about 200,000 g/mol, or from about 25,000 to about 150,000 g/mol.

PE3-type polyethylenes have a molecular weight distribution ($M_w/M_n$) of from about 1.5 to about 5.0, particularly from about 2.0 to about 4.0, preferably from about 3.0 to about 4.0 or from about 2.5 to about 4.0.

The ratio of the z-average molecular weight ($M_z$) to weight average molecular weight ($M_w$) for PE3-type polyethylenes may be greater than about 1.5 or greater than about 1.7 or greater than about 2.0. In one embodiment, this ratio is from about 1.7 to about 3.5. In yet another embodiment, this ratio is from about 2.0 to about 3.0, or from about 2.2 to about 3.0.

The PE3-type polyethylenes in certain embodiments have a melt index (MI) or ($I_{2.16}$) as measured by ASTM D-1238-E (190° C./2.16 kg) of about 0.1 to about 300 g/10 min, preferably about 0.1 to about 100 g/10 min, about 0.1 to about 50 g/10 min, about 0.1 g/10 min to about 5.0 g/10 min, about 0.2 to 1.5 g/10 min, about 0.3 to 1.0 g/10 min, 0.5 to 1.0 g/10 min, 0.6 to 1.0 g/10 min, 0.7 to 1.0 g/10 min, or 0.75 to 0.95 g/10 min, particularly about 0.8 g/10 min.

Some PE3-type polyethylenes have a melt index ratio ($I_{21.6}/I_{2.16}$) ($I_{21.6}$ is measured by ASTM D-1238-F, i.e., 190° C./21.6 kg) of from about 10.0 to about 50.0, 15.0 to 45.0, more preferably 20.0 to 40.0, or 22 to about 38.

In some embodiments, PE3-type polyethylenes exhibit a melting temperature as measured by differential scanning calorimetry ("DSC") of from about 90° C. to about 130° C. An exemplary method of identifying a composition's melting temperature is determined by first pressing a sample of the composition at elevated temperature and removing the sample with a punch die. The sample is then annealed at room temperature. After annealing, the sample is placed in a differential scanning calorimeter, e.g., Perkin Elmer 7 Series Thermal Analysis System, and cooled. Then the sample is heated to a final temperature and the thermal output, $\Delta H_f$, is recorded as the area under the melting peak curve of the sample. The thermal output in joules is a measure of the heat of fusion. The melting temperature, $T_m$, is recorded as the temperature of the greatest heat absorption within the range of melting of the sample. This is called the first melt. $T_{c1}$ is the first non-isothermal crystallization temperature, which is recorded as the temperature of greatest heat generation. The sample is then cooled. The sample is reheated to form a second melt, which is more reproducible than the first melt. The peak melting temperature from the second melt is recorded as the second melting temperature, $T_m$. $T_{c2}$ is second non-isothermal crystallization temperature, and $\Delta H_{c2}$ is the second heat of crystallization. Preferably, ethylene-based polymers of these embodiments exhibit a second melt temperature of from about 100° C. to about 130° C., or about 110° C. to about 130° C., or from about 119° C. to about 123° C. Preferably, ethylene-based polymers of these embodiments exhibit a first melt temperature of from about 95° C. to about 125° C., or from about 100° C. to about 118° C., or from about 107° C. to about 110° C.

In another embodiment, the PE3-type polyethylenes herein contain less than 5.0 ppm hafnium, generally less than 2.0 ppm hafnium, preferably less than 1.5 ppm hafnium, more preferably less than 1.0 ppm hafnium. In an embodiment, the polymer contains in the range of from about 0.01 ppm to about 2 ppm hafnium, preferably in the range of from about 0.01 ppm to about 1.5 ppm hafnium, more preferably in the range of from about 0.01 ppm to 1.0 ppm hafnium. Preferably, the amount of hafnium is greater than the amount of zirconium in the ethylene-based polymer. In other words, in particular embodiments the ratio of hafnium to zirconium (ppm/ppm) is at least 2.0, at least 10.0, at least 15.0, at least 17.0, at least 20.0, or at least about 25.0. While zirconium generally is present as an impurity in hafnium, it will be realized in some embodiments where particularly pure hafnium-containing catalysts are used, the amount of zirconium may be extremely low, resulting in an undetectable amount of zirconium in the ethylene-based polymer. Thus, the upper limit on the ratio of hafnium to zirconium in the polymer can be 50.0, 100.0, 200.0, 500.0 or more.

Particular PE3-type polyethylenes have at least a first peak and a second peak in a comonomer distribution analysis, wherein the first peak has a maximum at a $\log(M_w)$ value of 4.0 to 5.4, particularly 4.3 to 5.0, more particularly 4.5 to 4.7; and a TREF elution temperature of 70.0° C. to 100.0° C., particularly 80.0° C. to 95.0° C., more particularly 85.0° C. to 90.0° C. The second peak in the comonomer distribution analysis has a maximum at a $\log(M_w)$ value of 5.0 to 6.0, particularly 5.3 to 5.7, more particularly 5.4 to 5.6; and a TREF elution temperature of 40.0° C. to 60.0° C., particularly 45.0° C. to 60.0° C., more particularly 48.0° C. to 54.0° C.; a melt index (190° C./2.16 kg) of from about 0.1 g/10 min to about 5.0 g/10 min; a melt index ratio of from about 15 to about 30; a $M_w$ of from about 20,000 to about 200,000 g/mol; a $M_w/M_n$ of from about 2.0 to about 4.5; and a density of from 0.910 to 0.925 g/cm³. More preferred polymers also have therein an amount of hafnium that is greater than the amount of zirconium, particularly a ratio of hafnium to zirconium (ppm/ppm) is at least 2.0, at least 10.0, at least 15.0, at least 17.0, at least 20.0, or at least about 25.0.

PE3-type polyethylenes typically have an orthogonal comonomer distribution. The term "orthogonal comonomer distribution" is used herein to mean across the molecular weight range of the ethylene polymer, comonomer contents for the various polymer fractions are not substantially uniform and a higher molecular weight fraction thereof generally has a higher comonomer content than that of a lower molecular weight fraction. The term "substantially uniform comonomer distribution" is used herein to mean that comonomer content of the polymer fractions across the molecular weight range of the ethylene-based polymer vary by <10.0 wt. %. In some embodiments, a substantially uniform comonomer<8.0 wt. %, <5.0 wt. %, or <2.0 wt. %. Both a substantially uniform and an orthogonal comonomer distribution can be determined using fractionation techniques such as gel permeation chromatography-differential viscometry (GPC-DV), temperature rising elution fraction-differential viscometry (TREF-DV) or cross-fractionation techniques.

Polymerization processes for making PE3-type polyethylenes described herein are disclosed in U.S. Pat. No. 6,956,088 to Farley, including use of a hafnium transition metal metallocene-type catalyst system as described in U.S. Pat. No. 6,242,545 and/or U.S. Pat. No. 6,248,845, particularly Example 1, hereby incorporated by reference.

While the polymerization processes are described therein, certain features are reproduced here for convenience.

As described therein, polymerization catalyst in a supported form, for example deposited on, bonded to, contacted with, or incorporated within, adsorbed or absorbed in, or on, a support or carrier may be used. The metallocene catalyst may be introduced onto a support by slurrying a presupported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. Very low solubilizing media such as mineral oil (e.g., Kaydo™ or Drakol™) or pentane may be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. The mixing time may be greater than 4 hours, but shorter times are suitable.

The substituted bulky ligand hafnium transition metal metallocene-type catalyst compounds and catalyst systems discussed above are suited for the polymerization of monomers, and optionally one or more comonomers, in any polymerization process, solution phase, gas phase, or slurry phase. Typically in a gas phase polymerization process a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399; 4,588,790; 5,028,670; 5,317,036; 5,352,749; 5,405,922; 5,436,304; 5,453,471; 5,462,999; 5,616,661; and 5,668,228, all of which are fully incorporated herein by reference).

Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. The reactor pressure may vary from 100-500 psig (680-3448 kPag), or in the range of from 200-400 psig (1379-2759 kPag), or in the range of from 250-350 psig (1724-2414 kPag). The reactor temperature may vary between 60-120° C., or 60-115° C., or in the range of from 70-110° C., or in the range of from 70-95° C., or 70-90° C. The productivity of the catalyst or catalyst system is influenced by the main monomer partial pressure. The mole percentage of the main monomer, ethylene, is from 25.0-90.0 mole %, or 50.0-90.0 mole %, or 70.0-85.0 mole %, and the monomer partial pressure is in the range of from 75-300 psia (517-2069 kPa), or 100-275 psia (689-1894 kPa), or 150-265 psia (1034-1826 kPa), or 200-250 psia (1378-1722 kPa), typical conditions in a gas phase polymerization process.

Other gas phase processes contemplated by the process of the invention include those described in U.S. Pat. Nos. 5,627,242; 5,665,818; and 5,677,375, and European Pat. Appls. EP-A-0 794 200, EP-A-0 802 202 and EP-B-0 634 421, all of which are herein fully incorporated by reference.

It may be beneficial to operate in the substantial absence of or essentially free of any scavengers, such as triethylaluminum, trimethylaluminum, triisobutylaluminum, and tri-n-hexylaluminum and diethyl aluminum chloride and the like. This process is described in PCT Publication No. WO 96/08520, which is herein fully incorporated by reference.

A slurry polymerization process generally uses pressures in the range of 1 to 50 atmospheres and even greater and temperatures in the range of 0° C. to 200° C. In a slurry polymerization, a suspension of solid, particulate polymer is formed in a liquid polymerization medium to which ethylene and comonomers and often hydrogen along with catalyst are added. The liquid employed in the polymerization medium can be alkane or cycloalkane, or an aromatic hydrocarbon such as toluene, ethylbenzene, or xylene. The medium employed should be liquid under the conditions of polymerization and relatively inert. Hexane or isobutane medium may be employed.

PE3-type polyethylenes may be prepared by a process referred to as a particle form, or slurry process where the temperature is kept below the temperature at which the polymer goes into solution. Such technique is well known in the art, see for instance U.S. Pat. No. 3,248,179, which is fully incorporated herein by reference. The temperature in the particle form process is within the range of 85-110° C. (185-230° F.) Two polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

Typical reactors for producing ethylene-based polymers are capable of producing greater than 500 lbs/hr (227 kg/hr) to 200,000 lbs/hr (90,900 kg/hr) or higher of polymer, or greater than 1000 lbs/hr (455 kg/hr), or greater than 10,000 lbs/hr (4540 kg/hr), or greater than 25,000 lbs/hr (11,300 kg/hr), or greater than 35,000 lbs/hr (15,900 kg/hr), or greater than 50,000 lbs/hr (22,700 kg/hr), or greater than 65,000 lbs/hr (29,000 kg/hr) to greater than 100,000 lbs/hr (45,500 kg/hr).

Persons having skill in the art will recognize that the above-described processes may be tailored to achieve desired PE3-type polyethylenes. For example, comonomers to ethylene concentration or flow rate ratios are commonly used to control resin density. Similarly, hydrogen to ethylene concentrations or flow rate ratios are commonly used to control resin molecular weight. In both cases, higher levels of a modifier results in lower values of the respective resin parameter. Gas concentrations may be measured by, for example, an on-line gas chromatograph or similar apparatus to ensure relatively constant composition of recycle gas streams.

Additionally, the use of a process continuity aid, while not required, may be desirable in preparing the ethylene-based polymers, particularly for large-scale production. Such continuity aids are well known to persons of skill in the art and include, for example, metal stearates.

PE4-Type Polyethylenes

PE4-type polyethylenes have a $g'_{vis}$ as described below of 0.50 to 0.85, particularly 0.50 to 0.80, 0.50 to 0.75, 0.50 to 0.70, 0.50 to 0.65, 0.50 to 0.60, or 0.50 to 0.55.

Preferably, PE4 polymers are copolymer of ethylene one or more polar comonomers. Typically, third ethylene based polymers useful herein include 99.0 to about 80.0 wt. %, 99.0 to 85.0 wt. %, 99.0 to 87.5 wt. %, 95.0 to 90.0 wt. %, of polymer units derived from ethylene and about 1.0 to about 20.0 wt. %, 1.0 to 15.0 wt. %, 1.0 to 12.5 wt. %, or 5.0 to 10.0 wt. % of polymer units derived from one or more polar comonomers. Preferably, PE4-type polyethylenes are an ethylene/vinyl acetate copolymer having about 2.0 wt. % to about 15.0 wt. %, typically about 5.0 wt. % to about 10.0 wt. %, polymer units derived from vinyl acetate, based on the amounts of polymer units derived from ethylene and vinyl acetate. In certain embodiments, the EVA resin can further include polymer units derived from one or more comonomer units selected from propylene, butene, 1-hexene, 1-octene, and/or one or more dienes. Suitable dienes include, for example, 1,4-hexadiene, 1,6-octadiene, 5-methyl-1,4-hexadiene, 3,7-dimethyl-1,6-octadiene, dicyclopentadiene (DCPD), ethylidene norbornene (ENB), norbornadiene, 5-vinyl-2-norbornene (VNB), and combinations thereof PE4-type polyethylenes may have a melt index ("MI"), as measured according to ASTM D1238, 2.16 kg, 190° C., of 0.05 to 12.0 g/10 min, particularly 0.1 to 2.5 g/10 min, 0.2 to 1.0, or 0.3 to 0.7 g/10 min.

In some embodiments, the PE4-type polyethylene has a melting point of 40° C. or less, as measured by industry acceptable thermal methods, such as Differential Scanning calorimetry (DSC). In other embodiments, the melting point can may be 40.0° C. to about 90.0° C.; 40.0° C. to 80.0° C.; 50.0° C. to 70.0° C.; 55.0° C. to 65.0° C.; or about 60.0° C.

PE4-type polyethylene may have a Vicat softening point of about 20.0° C. to about 80.0° C., as measured by ASTM D1525. The Vicat softening point can also range from a low of about 20° C., 25.0° C., or 30.0° C. to a high of about 35.0° C., 40.0° C., or 50.0° C. The Vicat softening point of the HPPE resin can also be 20.0° C. to 70.0° C.; 30.0° C. to 60.0° C.; 35.0° C. to 45.0° C.; about 35.0° C., or 40.0° C.

In some embodiments, the PE4-type polyethylene includes 0.1 wt. % to 10.0 wt. % units derived from one or more modifiers, based on the total weight of the resin. The amount of the modifier(s) can range from a low of about 0.1 wt. %, 0.3 wt. %, or 0.8 wt. % to a high of about 3.0 wt. %, 6.0 wt. %, or 10.0 wt. %, based on the total weight of the resin. The amount of the modifier(s) can also range from a low of about 0.2 wt. %, 0.4 wt. %, or 0.8 wt. % to a high of about 1.5 wt. %, 2.5 wt. %, 3.6 wt. %, or 5 wt. %, based on the total weight of the resin. The amount of the modifier can also be 0.1 wt. % to 8 wt. %; 0.2 wt. % to 6 wt. %; 0.3 wt. % to 6 wt. %; 0.3 wt. % to 4 wt. %; 0.4 wt. % to 4.0 wt. %; 0.6 wt. % to 4 wt. %; 0.4 wt. % to 3.5 wt. %; or 0.5 wt. % to 3.8 wt. %, based on the total weight of the resin.

Suitable modifiers, also called chain transfer agents, are described in Advances in Polymer Science, Vol. 7, pp. 386-448 (1970). Particular modifiers are $C_2$ to $C_{12}$ unsaturated modifiers containing at least one unsaturation, but they can also contain multiple conjugated or non-conjugated unsaturations. In case of multiple unsaturations, it is preferred that they are non-conjugated. In certain embodiments, the unsaturation of the $C_2$ to $C_{12}$ unsaturated modifier can be di-substituted with one or more alkyl groups in the beta position. Preferred $C_2$ to $C_{12}$ unsaturated modifiers include propylene, isobutylene, or a combination thereof.

PE4-type polyethylene can also contain one or more antioxidants. Phenolic antioxidants are preferred, such as butylated hydroxytoluene (BHT) or other derivatives containing butylated hydroxytoluene units such as Irganox 1076 or Irganox 1010 and alike. The antioxidant can be present in an amount less than 0.05 wt. %, based on the total weight of the resin. When present, for example, the amount of the one or more antioxidants can range from a low of about 0.001 wt. %, 0.005 wt. %, 0.01 wt. %, or 0.015 wt. % to a high of about 0.02 wt. %, 0.03 wt. %, 0.04 wt. %, or 0.05 wt. %.

PE4-type polyethylene can further contain one or more additives. Suitable additives can include, but are not limited to: stabilization agents such as antioxidants or other heat or light stabilizers; anti-static agents; crosslink agents or co-agents; crosslink promotors; release agents; adhesion promotors; plasticizers; or any other additive and derivatives known in the art. Suitable additives can further include one or more anti-agglomeration agents, such as oleamide, stearamide, erucamide, or other derivatives with the same activity as known to the person skilled in the art. Preferably, the HPPE resin contains less than 0.15 wt. % of such additives, based on the total weight of the resin. When present, the amount of the additives can also range from a low of about 0.01 wt. %, 0.02 wt. %, 0.03 wt. %, or 0.05 wt. % to a high of about 0.06 wt. %, 0.08 wt. %, 0.11 wt. %, or 0.15 wt. %.

PE4-type polyethylenes are available from ExxonMobil Chemical Company as ExxonMobil™ LDPE or Nexxstar™ resins.

PE5-Type Polyethylenes

PE5-type polyethylenes are generally heterogeneously branched ethylene polymers. The term "heterogeneously branched ethylene polymer" refers to an polymer having polymer units derived from ethylene and preferably at least one $C_3$ to $C_{20}$ alpha-olefin and having a CBDI <50.0%. Typically such polymers are the result of a Ziegler polymerization process. Such polymers are also referred to as LLDPEs, more particularly sometimes as ZN LLDPEs.

Heterogeneously branched ethylene polymers differ from the homogeneously branched ethylene polymers primarily in their branching distribution. For example, heterogeneously branched LLDPE polymers have a distribution of branching, including a highly branched portion (similar to a very low density polyethylene), a medium branched portion (similar to a medium branched polyethylene) and an essentially linear portion (similar to linear homopolymer polyethylene). The amount of each of these fractions varies depending upon the whole polymer properties desired. For example, linear homopolymer polyethylene has neither branched nor highly branched fractions, but is linear.

Heterogeneously branched ethylene polymers have lower amounts of the highly branched fraction, but have a greater amount of the medium branched fraction. While ATREF will show homogeneously branched ethylene polymers typically are characterized by a single relatively narrow peak at some elution temperature, some heterogeneously branched ethylene polymers have a broad branching distribution, as represented by the breadth of elution temperatures over which the polymer fractions elute. Such polymers may also have a distinct peak at an elution temperature characteristic of a "linear", "high density" or "crystalline" polymer fraction.

Heterogeneously branched ethylene polymer typically has a CBDI <50.0%, preferably <45.0%, <40.0%, <35.0%, <30.0%, <25.0%, or <20.0%. In particular embodiments the CBDI of the heterogeneously branched ethylene polymer is 20.0 to <50.0%, 20.0 to 45.0%, 20.0 to 35.0%, 20.0 to 30.0%, 20.0 to 25.0%, 25.0 to 30.0%, 25.0 to 35.0%, 25.0 to 40.0%, 25.0 to 45.0%, 30.0 to 35.0%, 30.0 to 40.0%, 30.0 to 45.0%, 30.0 to <50.0%, 35.0 to 40.0%, 35.0 to <50.0%, 40.0 to 45.0%, or 40.0 to <50.0%.

The heterogeneously branched ethylene polymer typically comprises 80 to 100 mole % of polymer units derived from ethylene and 0 to 20.0 mole % of polymer units derived from at least one $C_3$ to $C_{20}$ alpha-olefin, preferably the alpha olefin has 4 to 8 carbon atoms. The content of comonomer is determined based on the mole fraction based on the content of all monomers in the polymer.

The content of polymer units derived from alpha-olefin in the heterogeneously branched ethylene polymer may be any amount consistent with the above ranges for ethylene. Some preferred amounts are 2.0 to 20.0 mole %, 2.0 to 15.0 mole %, or 5.0 to 10.0 mole %, particularly where the polymer units are derived from one or more $C_4$ to $C_8$ alpha-olefins, more particularly butene-1, hexene-1, or octene-1.

Heterogeneously branched ethylene polymer has a density ≤0.950 g/cm$^3$, preferably ≤0.940 g/cm$^3$, particularly from 0.915 to about 0.950 g/cm$^3$, preferably 0.920 to 0.940 g/cm$^3$.

The melt index, $I_{2.16}$, according to ASTM D-1238-E (190° C./2.16 kg) of the heterogeneously branched ethylene polymer is generally from about 0.1 g/10 min to about 100.0 g/10 min.

Particular heterogeneously branched ethylene polymers have a density of 0.915 g/cm$^3$ to 0.945 g/cm$^3$, preferably 0.920 to 0.940 g/cm$^3$, and a melt index of 0.50 to 60.0 g/10 min, preferably 0.50 to 5.0 g/10 min. Preferably, the CBDI of such polymers is 20.0 to <50.0%, 25.0 to 45.0%, 30.0 to 40.0%, or 35.0 to 40.0%.

Heterogeneously branched ethylene polymers are typically characterized by a relatively broad molecular weight distribution ($M_w/M_n$), e.g., greater than 3.0, preferably at least 3.2, and more preferably at least 3.3.

Some heterogeneously branched ethylene polymers used herein also have at least two melting points, as determined using Differential Scanning calorimetry (DSC) between the temperature range of −30° C. to 150° C.

Heterogeneously branched ethylene polymers are LLDPE grades available from ExxonMobil Chemical Company.

Propylene-based Polymer

Certain embodiments described herein refer to propylene-based polymers. The term propylene-based polymer refers to a homopolymer, copolymer, or impact copolymer including >50.0 mol % of polymer units derived from propylene. Some useful propylene-based polymers include those having one or more of the following properties:

1) propylene content of at least 85 wt. % (preferably at least 90 wt. %, preferably at least 95 wt. %, preferably at least 97 wt. %, preferably 100 wt. %); and/or
2) $M_w$ of 30 to 2,000 kg/mol (preferably 50 to 1,000 kg/mol, preferably 90 to 500 kg/mol); and/or
3) $M_w/M_n$ of 1 to 40 (preferably 1.4 to 20, preferably 1.6 to 10, preferably 1.8 to 3.5, preferably 1.8 to 2.5); and/or
4) branching index (g') of 0.2 to 2.0 (preferably 0.5 to 1.5, preferably 0.7 to 1.3, preferably 0.9 to 1.1); and/or 5) melt flow rate (MFR) of 1 to 300 dg/min (preferably 5 to 150 dg/min, preferably 10 to 100 dg/min, preferably 20 to 60 dg/min); and/or
6) melting point ($T_m$, peak second melt) of at least 100° C. (preferably at least 110° C., preferably at least 120° C., preferably at least 130° C., preferably at least 140° C., preferably at least 150° C., preferably at least 160° C., preferably at least 165° C.); and/or
7) crystallization temperature ($T_c$, peak) of at least 70° C. (preferably at least 90° C., preferably at least 110° C., preferably at least 130° C.); and/or
8) heat of fusion ($H_f$) of 40 to 160 J/g (preferably 50 to 140 J/g, preferably 60 to 120 J/g, preferably 80 to 100 J/g); and/or
9) crystallinity of 5 to 80% (preferably 10 to 75%, preferably 20 to 70%, preferably 30 to 65%, preferably 40 to 60%); and/or
10) propylene meso diads of 90% or more (preferably 92% or more, preferably 94% or more, preferably 96% or more); and/or
11) heat deflection temperature (HDT) of 45 to 140° C. (preferably 60 to 135° C., preferably 75 to 125° C.); and/or
12) Gardner impact strength at 23° C. of 30 to 1300 J (preferably 40 to 800 J, preferably 50 to 600 J); and/or
13) flexural modulus of 300 to 3000 MPa (preferably 600 to 2500 MPa, preferably 800 to 2000 MPa, preferably 1000 to 1500 MPa).

In a preferred embodiment, the propylene-based polymer is selected from polypropylene homopolymer, polypropylene copolymers, and blends thereof. The homopolymer may be atactic polypropylene, isotactic polypropylene, highly isotactic polypropylene, syndiotactic polypropylene, and blends thereof. The copolymer can be a random copolymer, a statistical copolymer, a block copolymer, and blends thereof.

The method of making the polypropylene is not critical, as it can be made by slurry, solution, gas-phase, high-pressure, or other suitable processes, through the use of catalyst systems appropriate for the polymerization of polyolefins, such as Ziegler-Natta-type catalysts, metallocene-type catalysts, other appropriate catalyst systems or combinations thereof. In a preferred embodiment the propylene polymers are made by the catalysts, activators and processes described in U.S. Pat. Nos. 6,342,566, 6,384,142, WO 03/040201, WO 97/19991 and U.S. Pat. No. 5,741,563. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al., *Selectivity in Propene Polymerization with Metallocene Catalysts*, 100 CHEM. REV., pp. 1253-1345 (2000); and I, II METALLOCENE BASED POLYOLEFINS (Wiley & Sons, 2000).

Polypropylene homopolymers or copolymers useful in the present invention may have some level of isotacticity or syndiotacticity. In one embodiment, the polypropylene is isotactic polypropylene, and in another embodiment, the polypropylene is highly isotactic polypropylene. In a desirable embodiment, the polypropylene is a polypropylene homopolymer having at least 85% (preferably at least 90%) isotactic pentads. In another desirable embodiment, the polypropylene is a polypropylene homopolymer having at least 85% (preferably at least 90%) syndiotactic pentads.

In a particularly described embodiment, the propylene-based polymer is produced by a metallocene catalyst system, and have a $M_w/M_n$ of 1.5 to 3 (preferably 1.8 to 2.5) and a CDBI of 80 wt. % or more (preferably 90 wt. % or more).

In another embodiment, the propylene-based polymer is a random copolymer, also known as an "RCP," comprising propylene and up to 20 mole % of ethylene or a $C_4$ to $C_{20}$ olefin, preferably up to 20 mole % ethylene, preferably from 1 to 10 mole % ethylene.

Films Providing Improved MD Elmendorf Tear

In particular embodiments, films comprising, preferably consisting essentially (i.e., monolayer films) of a relatively thick (i.e., greater than 20.0 μm) Layer A having improved MD Elmendorf Tear performance are described. Embodiments described herein provide relatively thick Layer A (i.e., greater than 20.0 μm) having an improved MD Elmendorf Tear. In particular relatively thick blown films having an MD Tear greater than 20.0 g/μm are provided.

Particular embodiments provide a film having a thickness of about 20.0 to about 100.0 μm, film comprising at least a Layer A comprising: a) 50.0 to 100.0 wt. %, based on the weight of Layer A, of a PE3-type polyethylene, and b) optionally, 1.0 to 50.0 wt. % of a polymer component selected from the group consisting of: i) a PE4-type polymer, ii) a PE5-type polymer, iii) a second PE3-type polyethylene, different from the first PE3-type polyethylene, having a density greater than 0.945 g/cm³, iv) a propylene-based polymer, and v) combinations thereof, the film having an MD Elmendorf Tear of 500.0 to about 1000.0 g/mil.

In certain embodiments, the Layer A comprises: a) 50.0 to 100.0 wt. %, based on the weight of Layer A, of a PE3-type polyethylene, and b) 1.0 to 50.0 wt. %, particularly 7.0 to 40.0 wt. %, 7.0 to 30.0 wt. %, 7.0 to 25.0 wt. %, or 7.0 to 15.0 wt. %, of a polymer component selected from the group consisting of: i) PE4-type polyethylene, ii) a PE5-type polyethylene, iii) a second PE3-type polyethylene, different from the first PE3-type polyethylene, having a density greater than 0.945 g/cm³, iv) a propylene-based polymer, and v) combinations thereof.

Preferably, the Layer A consists essentially of PE3-type polyethylene. In other words, the Layer A in some embodiments does not include more than 5.0 wt. %, 2.0% wt. %, 1.0 wt. %, or 0.1 wt. % of a polymer other than PE3-type polyethylenes.

In particular embodiments, the PE3-type polyethylene of Layer A has a melt index of from about 0.1 g/10 min to about 5.0 g/10 min, a melt index ratio of from about 18 to about 30, a weight average molecular weight ($M_w$) of from about 20,000 to about 200,000 g/mol, a molecular weight distribution ($M_w/M_n$) of from about 2.0 to about 4.5, and a density of from 0.910 to 0.960 g/cm³. Preferably, the PE-type polyethylene in Layer A has at least a first peak and a second peak in a comonomer distribution analysis, more particularly at least a first peak and a second peak in a comonomer distribution analysis, wherein the first peak has a maximum at a log($M_w$) value of 4.0 to 5.4 and a TREF elution temperature of 70.0° C. to 100.0° C. and the second peak has a maximum at a log($M_w$) value of 5.0 to 6.0 and a TREF elution temperature of 40.0° C. to 70.0° C.

In addition to Layer A, films may also include Layers B and C wherein Layer A is interposed therebetween, particularly where Layers B and C are in surface contact with opposing sides or surfaces of Layer A.

Films Providing Improved Impact Performance.

In other embodiments, multilayer films having improved dart impact performance are described. Particular such films have a Dart A impact strength of the multilayer film is at least 50.0% greater than the Dart A impact strength of a comparable multilayer film. The term "comparable multilayer film" refers to film having essentially the same composition and structure as an inventive film, with the proviso that the amount of first polyethylene of Layer A below is replaced by a polyethylene having a $g'_{vis}$ of 0.50 to 0.85, having a density ±0.003 g/cm$^3$, and a melt index $I_{2.16}$±0.05 of the first polyethylene of Layer A, preferably the polyethylene having a $g'_{vis}$ of 0.50 to 0.85 refers to a PE4-type polyethylene, (i.e., a polyethylene made by high-pressure polymerization). In particular such films, the Dart A impact strength of the film is at least 50.0% greater than the Dart A impact strength of a comparable film, wherein the Dart A impact strength is 700.0 to 1600.0 g/mil, particularly 750.0 to 1000.0 g/mil, 1000.0 to 1600.0 g/mil, 1200.0 to 1600.0 g/mil, or 1400.0 to 1600.0 g/mil. The lower limit on the range of Dart A impact strength may be 55.0%, 60.0%, 75.0%, 90.0%, 100.0%, 110.0%, 125.0%, 150.0%, 175.0%, 200.0%, 250.0%, 300.0%, or 500.0% greater than the Dart A impact strength of a reference film. The upper limit on the range of Dart A impact strength may be 55.0%, 60.0%, 75.0%, 90.0%, 100.0%, 110.0%, 125.0%, 150.0%, 175.0%, 200.0%, 250.0%, 300.0%, or 500.0% greater than the Dart A impact strength of a reference film. Any combination of such lower and upper limits is expressly disclosed.

In particular, films comprising a Layer A interposing Layers B and C, wherein Layer A comprises 5.0 to 35.0 wt. % of a first polyethylene. The first polyethylene is a PE1-type polyethylene having i) a $g'_{vis}$ ≤0.97; ii) 0.05 to 0.5 long-chain branches per/1000C atoms; iii) a density of 0.920 to 0.935 g/cm$^3$, and iv) a melt index ($I_{2.16}$) of 0.1 to 0.5 g/10 min. Preferably, the PE-type polyethylene of Layer A has a melt index ratio (MIR, $I_{21.6}/I_{2.16}$) of more than 35, and a $g'_{vis}$ indicative of long-chain branching (i.e., 0.80 to 0.97).

The Layer A typically includes 65.0 to 95.0 wt. %, preferably 70.0 to 90.0 wt. %, 75.0 to 85.0 wt. %, 77.5 to 82.5 wt. %, of a second polyethylene. The second polyethylene may be a PE1-, PE2-, or PE3-type polyethylene, preferably having a lower density and/or a higher melt index than the first polyethylene of Layer A.

Thus, in some embodiments the second polyethylene is also a PE1-type polyethylene such, particularly wherein the density of the second polyethylene is 0.915 to 0.925 g/cm$^3$ and the melt index ($I_{2.16}$) is 0.75 to 1.25 g/10 min, preferably 0.90 to 1.10 g/10 min. In other embodiments, the second polyethylene comprises a PE2-type polyethylene. In a particular embodiment, the PE2-type polyethylene has a density of 0.910 to 0.920 g/cm$^3$ (preferably 0.915 to 0.920 g/cm$^3$), a melt index ($I_{2.16}$) is 0.75 to 1.25 g/10 min, preferably 0.90 to 1.10 g/10 min, and a CDBI of 60% to 80%, preferably between 65% and 80%. In other embodiments, the second polyethylene of Layer A is a PE3-type polyethylene, particularly 0.915 to 0.925 g/cm$^3$ and the melt index ($I_{2.16}$) is 0.75 to 1.25 g/10 min.

Layers B and C typically comprise from 80.0 to 100.0 wt. % of at least one polyethylene selected from PE1, PE2, PE3-type polyethylene (including mixtures thereof). The lower limit on the amount of polyethylene in layers B and C may be 82.5, 85.0, 87.5, 90.0, 95.0, 97.5, or 99.0 wt. %. The upper limit on the amount of polyethylene in Layers B and C may be 82.5, 85.0, 87.5, 90.0, 95.0, 97.5, or 99.0 wt. %. Embodiments combining any lower limit and upper limit are envisioned. In particular embodiments, the Layer B and/or C includes 90.0 to 99.0 wt. % of a polyethylene selected from PE1, PE2, PE3-type polyethylene. The type and amounts polyethylene in Layers B and C may be the same or different. In particular embodiments, Layers B and C comprise or consist essentially of a PE1-type polyethylene. In other embodiments, Layers B and C comprise or consist essentially of a PE2-type polyethylene. In still other embodiments, Layers B and C comprise or consist essentially of a PE3-type polyethylene. More particularly, to 80.0 to 100.0 wt. % polyethylene of at least one of Layer B or C, preferably both, is the same type as the second polyethylene of the Layer A.

In an embodiment of the invention, the film may be produced using machine direction orientation (MDO). In an MDO process, the film is stretched at a temperature below its melting temperature in order to induce an orientation therein. In an embodiment of the invention, the film can be produced using MDO for annealing purposes.

In an embodiment of the invention, the film is drawn by a pull roll and threaded through a multiple roll MDO stage which may include pre-heat rolls, various stretching stages with or without annealing rolls between stages, one or more conditioning and annealing rolls, and one or more chill rolls. All rolls may be individually driven and temperature controlled. Stretching of the film in the MDO stage is accomplished by inducing a speed differential between two or more adjacent rolls.

In an embodiment of the invention, the films can be tailored to specific applications by adjusting the thickness, materials, and order of the various layers, as well as the additives in each layer.

Additives can be provided in the various film layers, as is well-known in the art.

In general, the term "natural draw ratio" refers to the stress elongation curve of a film in a region wherein the slope transitions between the slope of the yield plateau region and the slope of the strain hardening region, wherein the natural draw ratio is defined by the intersection between a line drawn through a linear portion of the strain hardening region and a line drawn through a linear portion of the yield plateau region of a film. For purposes herein, the natural draw ratio is determined from a stress-elongation measurement according to ASTM D-882, as the elongation at the intersection of a line drawn through a linear portion of the strain hardening region and a line drawn through a linear portion of the yield plateau region. The lines are calculated as linear regression fits to the data in the linear portions of the curves. The specific range of data points subjected to the linear regression analysis can be chosen by changing the lower elongation limit in steps of, for example, 5%, keeping the overall range constant at, for example, 50% (e.g., 50%-100%, 55%-105%, 60%-110%, etc.), and looking for the range which gives the lowest sum of squared differences between predicted and actual data.

Particular Embodiments

Embodiment A: A film having a thickness of about 20.0 to about 100.0 μm, film comprising at least a Layer A comprising: a) 50.0 to 100.0 wt. %, based on the weight of Layer A, of a PE3-type polyethylene having a hafnium: zirconium (ppm/ppm) ratio >1.0, a CDBI <50%, and a $g'_{vis}$ ≥0.98, and b) optionally, 1.0 to 50.0 wt. % of a polymer component selected from the group consisting of: i) PE4-type polyethylene, ii) a PE5-type polyethylene, iii) a second PE3-type polyethylene, different from the first PE3-type polyethylene, having a density greater than 0.945 g/cm$^3$, iv) a propylene-based polymer, and v) combinations thereof, the film having an MD Elmendorf Tear of 500.0 to about 1000.0 g/mil.

Embodiment B: A method of improving the MD Elmendorf Tear strength of a film having a thickness of about 20.0 to about 100.0 μm, the method comprising: a) providing a Layer A, the Layer A comprising: i) 50.0 to 100.0 wt. %, based on the weight of Layer A, of a PE3-type polyethylene having a hafnium: zirconium (ppm/ppm) ratio >1.0, a CDBI <50%, and a $g'_{vis}$ ≥0.98, and b) optionally, 1.0 to 50.0 wt. % of a polymer component selected from the group consisting of: i) PE4-type polyethylene, ii) a PE5-type polyethylene, iii) a second PE3-type polyethylene, different from the first PE3-type polyethylene, having a density greater than 0.945 g/cm$^3$, iv) a propylene-based polymer, and v) combinations thereof, c) optionally providing a Layer B in surface contact with a first surface of Layer A, d) further optionally providing a Layer C in surface contact with a second surface of Layer A, and e) orienting the film to provide an MD Elmendorf Tear of 500.0 to about 1000.0 g/mil.

Embodiment C: Any of Embodiments A to B, wherein the hafnium: zirconium (ppm/ppm) ratio is ≥2.0, particularly wherein the PE3-type polyethylene has a hafnium concentration >5.0 ppm; particularly wherein the hafnium to zirconium (ppm/ppm) ratio is 2.0 to 500.0, 10.0 to 200.0, 15.0 to 100.0, 17.0 to 50.0, or 20.0 to 25.0.

Embodiment D: Any of Embodiments A to C, wherein the PE3-type polyethylene has a melt index of 0.1 g/10 min to 5.0 g/10 min, particularly 0.2 to 1.5 g/10 min, 0.3 to 1.0 g/10 min, 0.5 to 1.0 g/10 min, 0.6 to 1.0 g/10 min, 0.7 to 1.0 g/10 min, 0.75 to 0.95 g/10 min, or about 0.8 g/10 min.

Embodiment E: Any of Embodiments A to D, wherein the PE3-type polyethylene has a melt index ratio of from 10.0 to 50.0, 15.0 to 45.0, 20.0 to 40.0, 22.0 to about 38.0, or about 18.0 to about 30.0.

Embodiment F: Any of Embodiments A to E, wherein the PE3-type polyethylene has a weight average molecular weight ($M_w$) of from 15,000 to about 250,000 g/mol, preferably 20,000 to 200,000 g/mol, or 25,000 to 150,000 g/mol.

Embodiment G: Any of Embodiments A to F, wherein the PE3-type polyethylene has a molecular weight distribution ($M_w/M_n$) of from about 1.5 to about 5.0, particularly from 2.0 to 4.5, 2.0 to 4.0, or 3.0 to 4.0, particularly wherein $M_z/M_w$ is 1.7 to 3.5, 2.0 to 3.0, or 2.2 to 3.0.

Embodiment H: Any of Embodiments A to G, wherein the PE3-type polyethylene has a density of from 0.910 to 0.960 g/cm$^3$, particularly 0.912 to 0.925 g/cm$^3$, from 0.915 to 0.921 g/cm$^3$, or 0.916 to 0.918 g/cm$^3$.

Embodiment I: Any of Embodiments A to H, wherein the PE3-type polyethylene has a CDBI <50.0%, particularly 20.0 to 45.0%, 25.0 to 40.0%, 20.0% to 35.0%, or 25.0% to 28.0%.

Embodiment J: Any of Embodiments A to I, wherein the PE3-type polyethylene has at least a first peak and a second peak in a comonomer distribution analysis.

Embodiment K: Any of Embodiments A to J, wherein the PE3-type polyethylene has at least a first peak and a second peak in a comonomer distribution analysis, wherein the first peak has a maximum at a log($M_w$) value of 4.0 to 5.4 and a TREF elution temperature of 70.0° C. to 100.0° C. and the second peak has a maximum at a log($M_w$) value of 5.0 to 6.0 and a TREF elution temperature of 40.0° C. to 70.0° C.

Embodiment L: Any of Embodiments A to K, wherein the Layer A is essentially free of a polymer component selected from the group consisting of: i) a PE4-type polyethylene, ii) a PE5-type polyethylene, iii) a second PE3-type polyethylene, different from the first PE3-type polyethylene, having a density greater than 0.945 g/cm$^3$, iv) a propylene-based polymer, and v) combinations thereof.

Embodiment M: Any of Embodiments A to L, wherein the Layer A further comprises 1.0 to 50.0 wt. % of a polymer component selected from the group consisting of: i) a PE4-type polymer, ii) a PE5-type polymer, iii) a second PE3-type polyethylene, different from the first PE3-type polyethylene, having a density greater than 0.945 g/cm$^3$, iv) a propylene-based polymer, and v) combinations thereof.

Embodiment N: Any of Embodiments A to M, wherein the film is a multilayer film, further including optional Layer B in surface contact with a first surface of Layer A, and optional Layer C in surface contact with a second surface of Layer A.

Embodiment O: Any of Embodiments A to N, wherein the film is a multilayer Blown film.

Embodiment P: Any of the method of Embodiments B to O, wherein the providing Layer A and any optional Layers B and C including operating at a die throughput ≥10 lbs/hour-inch of die.

Embodiment Q: Any of the method of Embodiments B to P, wherein orienting the film includes orienting the film at a blow-up ratio ≥1.2, particularly 1.2 to 5.0, 1.5 to 3.0, or 1.75 to 2.5.

Embodiment R: Any of the method of Embodiments B to Q, wherein the frost line height is 20.0 to 40.0 inches.

Embodiment S: A method of improving the MD Elmendorf Tear of a film having a thickness of about 20.0 to about 100.0 μm, the method comprising: a) providing a monolayer extrudate consisting essentially of a PE3-type polyethylene having a hafnium: zirconium (ppm/ppm) ratio ≥2.0, a CDBI <50%, and a g'$_{vis}$ ≥0.98, a hafnium concentration >5.0 ppm; a melt index of from about 0.1 g/10 min to about 5.0 g/10 min; a melt index ratio of from about 18 to about 30; a weight average molecular weight ($M_w$) of from about 20,000 to about 200,000 g/mol; a molecular weight distribution ($M_w/M_n$) of from about 2.0 to about 4.5; and a density of from 0.910 to 0.960 g/cm$^3$; and b) forming the extrudate into a film at a rate of throughput ≥10 lbs/hour-inch of die; orienting the film at a blow-up ratio ≥1.2, at a frost line height of 20.0 to 40.0 in.

Embodiment T: The method of Embodiment S, wherein the PE3-type polyethylene has a CDBI of 20.0 to 50.0%.

Embodiment U: The method of Embodiment S or T, wherein the PE3-type polyethylene has at least a first peak and a second peak in a comonomer distribution analysis.

Embodiment V: The method of Embodiment S to U, wherein the PE3-type polymer has at least a first peak and a second peak in a comonomer distribution analysis, wherein the first peak has a maximum at a log($M_w$) value of 4.0 to 5.4 and a TREF elution temperature of 70.0° C. to 100.0° C. and the second peak has a maximum at a log($M_w$) value of 5.0 to 6.0 and a TREF elution temperature of 40.0° C. to 70.0° C.

Embodiment W: The method of Embodiment S to V, wherein the film has an MD Elmendorf Tear of 500.0 to about 1000.0 g/mil.

Embodiment AA: A method of improving the Dart A impact strength of a multilayer film, said method comprising providing a Layer A, the Layer A comprising: a) about 5.0 to about 35.0 wt. % of a first PE1-type polymer having a g'$_{vis}$ ≤0.97, 0.05 to 0.5 long-chain branches per/1000C atoms, a density of 0.920 to 0.935 g/cm$^3$, and a melt index of 0.1 to 0.5 g/10 min; and b) 95.0 to 65.0 wt. % of a second polyethylene; based on the total weight of Layer A, wherein the Dart A impact strength of the multilayer film is at least 50.0% greater than the Dart A impact strength of a comparable multilayer film.

Embodiment AB: The method of Embodiment AA, wherein the second polyethylene is a PE2-type polyethylene comprising ≥50.0 wt. % polymer units derived from ethylene and ≤50 wt. % polymer units derived from a $C_3$ to $C_{20}$ comonomer, based upon the weight of the second ethylene-based polymer, wherein the second ethylene-based polymer has a CDBI ≥60%, a density of 0.910 to 0.950 g/cm$^3$ and a g'$_{vis}$ ≥0.98.

Embodiment AC: The method of Embodiment AA, wherein the second polyethylene is a PE1-type polyethylene having a $g'_{vis}$ ≤0.97, 0.05 to 0.5 long-chain branches per/1000C atoms, a density of 0.910 to 0.950 g/cm$^3$, and a melt index of 0.1 to 0.5 g/10 min.

Embodiment AD: Any of Embodiments AA or AC, wherein the second polyethylene comprises a PE1-type polyethylene comprising ≥50.0 wt. % polymer units derived from ethylene and ≤50 wt. % polymer units derived from a C$_5$ to C$_{20}$ comonomer, based upon the weight of PE2-type polyethylene, and having a melt index of from 0.1 to 15.0; a CDBI ≥70%, a density of from 0.910 to 0.950 g/cm$^3$; a Haze value <20.0; a melt index ratio of 35.0 to 80.0; an averaged Modulus (M, psi) of 2.00×10$^5$ to 6.00×10$^5$ psi and a relation between M and the Dart A impact strength (DIS, g/mil) complying with the formula:

$$DIS \geq 0.8 \times [100 + e^{(11.71 - 0.000268 \times M + 2.183 \times 10^{-9} \times M^2)}],$$

where "e" represents 2.1783, the base Napierian logarithm.

Embodiment AE: Embodiment AA, wherein the second polyethylene is a PE3-type polyethylene having a hafnium: zirconium (ppm/ppm) ratio >1.0, particularly ≥2.0, 2.0 to 500.0, 10.0 to 200.0, 15.0 to 100.0, 17.0 to 50.0, or 20.0 to 25.0.

Embodiment AF: Embodiment AA or AE wherein the PE3-type polyethylene has a CDBI <50%, particularly 20.0 to 45%, 25.0 to 40.0%, 20.0% to 35.0%, or 25.0% to 28.0%.

Embodiment AG: Any of Embodiments AA, AE, or AF, wherein the second polyethylene is a PE3-type polyethylene having a $g'_{vis}$ ≥0.98, particularly 0.98 to 1.0, or 0.99 to 1.0.

Embodiment AH: Any of Embodiments AA, or AE to AG, wherein the second polyethylene is a PE3-type polymer having a first peak and a second peak in a comonomer distribution analysis, wherein the first peak has a maximum at a log(M$_w$) value of 4.0 to 5.4 and a TREF elution temperature of 70.0° C. to 100.0° C. and the second peak has a maximum at a log(M$_w$) value of 5.0 to 6.0 and a TREF elution temperature of 40.0° C. to 70.0° C.

Embodiment AI: Any of Embodiments AA to AH further comprising: providing a Layer B in surface contact with a first surface of Layer A, and providing a Layer C in surface contact with a second surface of Layer A, wherein at least one of Layers B and C comprises 50.0 to 100.0 wt. %, based on the total weight of the individual Layers B and C, of a third polyethylene, wherein the third polyethylene and the second polyethylene may be the same or different.

Embodiment AJ: Embodiment AI, wherein the third polyethylene comprises a PE2-type polyethylene having ≥50.0 wt. % polymer units derived from ethylene and ≤50 wt. % polymer units derived from a C$_3$ to C$_{20}$ comonomer, based upon the weight of the PE2-type polymer, and a CDBI ≥60%, a density of 0.910 to 0.950 g/cm$^3$ and a $g'_{vis}$ ≥0.98.

Embodiment AK: Embodiment AI, wherein the third polyethylene comprises a PE1-type polymer having a $g'_{vis}$ ≤0.97, 0.05 to 0.5 long-chain branches per/1000C atoms, a density of 0.910 to 0.950 g/cm$^3$, and a melt index of 0.1 to 0.5 g/10 min.

Embodiment AL: Embodiment AI or AK, wherein the third polyethylene comprises a PE1-type polyethylene comprising ≥50.0 wt. % polymer units derived from ethylene and ≤50 wt. % polymer units derived from a C$_5$ to C$_{20}$ comonomer, based upon the weight of the third polyethylene, wherein the third polyethylene has a melt index of from 0.1 to 15.0; a CDBI ≥70%, a density of from 0.910 to 0.950 g/cm$^3$; a Haze value <20.0; a melt index ratio of 35.0 to 80.0; an averaged Modulus (M, psi) of 2.00×10$^5$ to 6.00×10$^5$ psi and a relation between M and the Dart A impact strength (DIS, g/mil) in g/mil complying with the formula:

$$DIS \geq 0.8 \times [100 + e^{(11.71 - 0.000268 \times M + 2.183 \times 10^{-9} \times M^2)}],$$

where "e" represents 2.1783, the base Napierian logarithm.

Embodiment AM: Embodiment AI, wherein the third polyethylene comprises a PE3-type polyethylene having a hafnium: zirconium (ppm/ppm) ratio greater than 1.0 particularly ≥2.0, 2.0 to 500.0, 10.0 to 200.0, 15.0 to 100.0, 17.0 to 50.0, or 20.0 to 25.0.

Embodiment AN: Embodiment AI or AM, wherein the third polyethylene comprises a PE3-type polyethylene having a CDBI <50%, particularly 20.0 to 45%, 25.0 to 40.0%, 20.0% to 35.0%, or 25.0% to 28.0%.

Embodiment AO: Any of Embodiments AI, AM, and AN, wherein the third polyethylene comprises a PE3-type polyethylene having a $g'_{vis}$ ≥0.98, particularly 0.98 to 1.0, or 0.99 to 1.0.

Embodiment AP: Any of Embodiments AI, and AM to AO, wherein the third polyethylene comprises a PE3-type polyethylene having at least a first peak and a second peak in a comonomer distribution analysis, wherein the first peak has a maximum at a log(M$_w$) value of 4.0 to 5.4 and a TREF elution temperature of 70.0° C. to 100.0° C. and the second peak has a maximum at a log(M$_w$) value of 5.0 to 6.0 and a TREF elution temperature of 40.0° C. to 70.0° C.

Embodiment AQ: A method of improving the Dart A impact strength of a co-extruded, blown multilayer film, said method comprising: a) providing a Layer A comprising: i) about 5.0 to about 35.0 wt. % of a first PE1-type polyethylene having a $g'_{vis}$ ≤0.97; 0.05 to 0.5 long-chain branches per/1000 C atoms; a density of 0.920 to 0.935 g/cm$^3$; and a melt index of 0.1 to 0.5 g/10 min; and ii) 95.0 to 65.0 wt. % of a second polyethylene comprising a PE2-type polyethylene having ≥50.0 wt. % polymer units derived from ethylene and ≤50 wt. % polymer units derived from a C$_3$ to C$_{20}$ comonomer, based upon the weight of the second polyethylene, wherein the PE2-type polyethylene has a CDBI ≥60%, a density of 0.910 to 0.950 g/cm$^3$ and a $g'_{vis}$ ≥0.98.; wt. % values based on the total weight of Layer A, b) providing a Layer B in surface contact with a first surface of Layer A, the Layer B comprising: i) 80.0 to 100.0 wt. % of a third polyethylene, wherein the third polyethylene comprises a second PE2-type polyethylene comprises ≥50.0 wt. % polymer units derived from ethylene and ≤50 wt. % polymer units derived from a C$_3$ to C$_{20}$ comonomer, based upon the weight of the third polyethylene, wherein the second PE2-type polyethylene having a CDBI ≥60%, a density of 0.910 to 0.950 g/cm$^3$ and a $g'_{vis}$ ≥0.98.; ii) and 0.0 to 20.0 wt. % of a fourth polyethylene, wt. % values based on the total weight of the Layer B; c) providing a Layer C in surface contact with a second surface of Layer A, the Layer C comprising: i) 80.0 to 100.0 wt. % of a fifth polyethylene, wherein the fifth polyethylene comprises a third PE2-type polyethylene having ≥50.0 wt. % polymer units derived from ethylene and ≤50 wt. % polymer units derived from a C$_3$ to C$_{20}$ comonomer, based upon the weight of the fifth polyethylene, wherein the fifth polyethylene has a CDBI ≥60%, a density of 0.910 to 0.950 g/cm$^3$ and a $g'_{vis}$ ≥0.98.; wt. % values based on the total weight of the Layer C; and ii) 0.0 to 20.0 wt. % of a sixth polyethylene, wt. % values based on the total weight of the Layer C; wherein each of the third, fourth, fifth and sixth polyethylenes may be the same or different, wherein the Dart A impact strength of the film is at least 50.0% greater than the Dart A impact strength of a comparable film, wherein the Dart A impact strength is 1200.0 to 1600.0 g/mil.

Embodiment AR: A method of improving the Dart A impact strength of a co-extruded, blown multilayer film, said method comprising: a) providing a Layer A comprising: i) about 5.0 to about 35.0 wt. % of a first polyethylene having a $g'_{vis}$ ≤0.97; 0.05 to 0.5 long-chain branches per/1000C atoms; a density of 0.920 to 0.935 g/cm$^3$; and a melt index of 0.1 to 0.5 g/10 min; and ii) 95.0 to 65.0 wt. % of a second polyethylene having a $g'_{vis}$ of 0.97 or less; 0.05 to 0.5 long-chain branches per/1000 C atoms; a density of 0.910 to 0.930 g/cm$^3$ and a melt index of 0.5 to 1.5 g/10 min; wt. % values based on the total weight of Layer A; b) providing a Layer B in surface contact with a first surface of Layer A, the Layer B comprising: i) 80.0 to 100.0 wt. % of a third polyethylene, wherein the third polyethylene has a $g'_{vis}$ of 0.97 or less; 0.05 to 0.5 long-chain branches per/1000 C atoms; a density of 0.910 to 0.930 g/cm$^3$ and a melt index of 0.5 to 1.5 g/10 min; and ii) 0.0 to 20.0 wt. % of a fourth polyethylene, wt. % values based on the total weight of the Layer B; and c) providing a Layer C in surface contact with a second surface of Layer A, the Layer C comprising: i) 80.0 to 100.0 wt. % of a fifth polyethylene, wherein the fifth polyethylene has a $g'_{vis}$ of 0.97 or less; 0.05 to 0.5 long-chain branches per/1000C atoms; a density of 0.910 to 0.930 g/cm$^3$ and a melt index of 0.5 to 1.5 g/10 min; all wt. % values are based on the total weight of the Layer C; and ii) 0.0 to 20.0 wt. % of a sixth polyethylene, wt. % values based on the total weight of the Layer C; wherein each of the third, fourth, fifth, and sixth ethylene-based polymers may be the same or different, wherein the Dart A impact strength of the film is at least 50.0% greater than the Dart A impact strength of a comparable film, wherein the Dart A impact strength is 250.0 to 400.0 g/mil.

Methods

Composition Distribution Branch Index (CDBI): Further details of determining the CDBI or SDBI of a copolymer are known to those skilled in the art. See, for example, PCT Pat. Appl. WO 93/03093, published Feb. 18, 1993.

Branching Index, $g'_{vis}$: Various methods are known for determining the presence of long-chain branches. For example, long-chain branching can be determined using $^{13}$C Nuclear Magnetic Resonance (NMR) spectroscopy and to a limited extent, e.g., for ethylene homopolymers and for certain copolymers, it can be quantified using the method of Randall, (Journal of Macromolecular Science, Rev. Macromol. Chem. Phys., C29 (2&3), p. 285-297). Although conventional $^{13}$C NMR spectroscopy cannot determine the length of a long-chain branch in excess of about six carbon atoms, there are other known techniques useful for quantifying or determining the presence of long-chain branches in ethylene-based polymers, such as ethylene/1-octene interpolymers. For those ethylene-based polymers wherein the $^{13}$C resonances of the comonomer overlap completely with the $^{13}$C resonances of the long-chain branches, either the comonomer or the other monomers (such as ethylene) can be isotopically labeled so that the long-chain branches can be distinguished from the comonomer. For example, a copolymer of ethylene and 1-octene can be prepared using $^{13}$C-labeled ethylene. In this case, the resonances associated with macromer incorporation will be significantly enhanced in intensity and will show coupling to neighboring $^{13}$C carbons, whereas the octene resonances will be unenhanced.

Alternatively, the degree of long-chain branching in ethylene-based polymers may be quantified by determination of the branching index, $g'_{vis}$. The branching index $g'_{vis}$ is defined by the following equation:

$$g'_{vis} = \frac{IV_{Br}}{IV_{Lin}}\bigg|_{Mw}$$

where $IV_{Br}$ is the intrinsic viscosity of the ethylene-based polymer composition and $IV_{Lin}$ is the intrinsic viscosity of the corresponding linear ethylene-based polymer having substantially the same weight average molecular weight and molecular weight distribution as the ethylene-based polymer composition and, in the case of copolymers and terpolymers, substantially the same relative molecular proportion or proportions of monomer units. For the purposes, the molecular weight and molecular weight distribution are considered "the same" if the respective values for the branched polymer and the corresponding linear polymer are within 10% of each other. Preferably, the molecular weights are the same and the MWD of the polymers are within 10% of each other. A method for determining intrinsic viscosity of polyethylene is described in Macromolecules, 2000, 33, 7489-7499. Intrinsic viscosity may be determined by dissolving the linear and branched polymers in an appropriate solvent, e.g., trichlorobenzene, typically measured at 135° C. Another method for measuring the intrinsic viscosity of a polymer is ASTM D5225-98—Standard Test Method for Measuring Solution Viscosity of Polymers with a Differential Viscometer, which is incorporated by reference herein in its entirety.

The branching index $g'_{vis}$ is inversely proportional to the amount of branching. Thus, lower values for g' indicate relatively higher amounts of branching. The amounts of short and long-chain branching each contribute to the branching index according to the formula: $g'_{vis}=g'_{LCB} \times g'_{SCB}$. Thus, the branching index due to long-chain branching may be calculated from the experimentally determined value for g' as described by Scholte, et al., in J. App. Polymer Sci., 29, 3763-3782 (1984), incorporated herein by reference.

Melt Index: Melt index is determined according to ASTM D-1238-E (190° C./2.16 kg), also sometimes referred to as $I_{2.16}$. High load melt index is determined according to ASTM D-1238-F (190° C./21.6 kg), also sometimes referred to as $I_{21.6}$. The term melt index ratio refers to the ratio of the high load melt index to the melt index (i.e., $I_{21.6}/I_{2.16}$).

Density: reported in grams per cubic centimeter (g/cm$^3$), is determined using chips cut from plaques compression molded in accordance with ASTM D-1928 Procedure C, aged in accordance with ASTM D-618 Procedure A, and measured as specified by ASTM D-1505.

Gauge: reported in μm, is measured using a Measuretech Series 200 instrument. The instrument measures film thickness using a capacitance gauge. For each film sample, ten film thickness datapoints are measured per inch of film as the film is passed through the gauge in a transverse direction. From these measurements, an average gauge measurement is determined and reported.

Elmendorf Tear is measured according to ASTM 1922.

Haze, reported as a percentage (%), is measured as specified by ASTM D-1003.

Gloss is measured according to ASTM-2457.

Dart $F_{50}$, or Dart Drop A Impact or Dart Drop Impact Strength (DIS), reported in grams (g) and/or grams per mil (g/mil), is measured as specified by ASTM D-1709, method A.

Puncture Break Energy, reported in inch-pounds (in-lb) and/or inch-pounds per mil (in-lb/mil), was determined according to ASTM D-3763.

EXAMPLES

Ethylene-Based Polymers

Polyethylene A: Polyethylene A is a PE1-type polyethylene having a density of 0.927 g/cm$^3$ and a melt index of 0.30 g/10 min; available from ExxonMobil Chemical Company as Enable™ 27-03 mPE.

Polyethylene B: Polyethylene A is a PE1-type polyethylene having a density of 0.920 g/cm$^3$ and a melt index of 1.0 g/10 min; available from ExxonMobil Chemical Company as Enable™ 20-10 mPE.

Polyethylene C: Polyethylene C is a PE2-type polyethylene having a density of 0.918 g/cm$^3$ and a melt index of 1.0 g/10 min; available from ExxonMobil Chemical Company as Exceed™ 1018CA mPE.

Polyethylene D: Polyethylene D is a PE3-type polyethylene made according to U.S. Pat. No. 6,956,088 using the bis(n-propylcyclopentadienyl)HfCl$_2$/MAO catalyst system under polymerization conditions to produce an ethylene-hexene polymer having a density of 0.9208 g/cm$^3$, a melt index ($I_{2.16}$) of nominally 0.75 g/10 min, and a melt index ratio ($I_{21.6}/I_{2.16}$) of about 32.3.

Polyethylene E: Polyethylene E is a PE3-type polyethylene made according to U.S. Pat. No. 6,956,088 using the bis(n-propylcyclopentadienyl)HfCl$_2$/MAO catalyst system under polymerization conditions to produce an ethylene-hexene polymer having a density of 0.9459 g/cm$^3$, a melt index ($I_{2.16}$) of nominally 4.1 g/10 min, and a melt index ratio ($I_{21.6}/I_{2.16}$) of about 16.8. PE1 has a comonomer content of about 0.8 wt. %, a $M_n$ of 32,162 g/mol, a $M_w$ of 84,160 g/mol, a Mz of 166,160 g/mol, $M_w/M_n$ (MWD) of 2.62, and an $M_z/M_w$ of 1.97. PE1 has a DSC $2^{nd}$ melting temperature of 129.1° C., crystallization peaks at temperatures of 115.5° C. (main) and 80.3° C. (minor), and a heat of fusion, $\Delta H_f$, of 181.46 J/g.

Polyethylene F: Polyethylene F is a PE3-type polyethylene made according to U.S. Pat. No. 6,956,088 using the bis(n-propylcyclopentadienyl)HfCl$_2$/MAO catalyst system under polymerization conditions to produce an ethylene-based polymer having a density of 0.918 g/cm$^3$, a melt index ($I_{2.16}$) of 0.80 g/10 min, and a melt index ratio ($I_{21.6}/I_{2.16}$) of 32. Polyethylene F has a first peak corresponding to a log($M_w$) value of about 4.5 that appears at a TREF elution temperature of 91.0° C. and a second peak at a log($M_w$) value of 5.3 and a TREF elution temperature of 63.0° C.

Polyethylene G: Polyethylene G is a PE3-type polyethylene made according to U.S. Pat. No. 6,956,088 using the bis(n-propylcyclopentadienyl)HfCl$_2$/MAO catalyst system under polymerization conditions to produce an ethylene-based polymer having a density of 0.916 g/cm$^3$ and a melt index ($I_{2.16}$) of 0.70 g/10 min. Polyethylene G has a first peak corresponding to a log($M_w$) value of about 4.5 that appears at a TREF elution temperature of 91.0° C. and a second peak at a log($M_w$) value of 5.2 and a TREF elution temperature of 63.0° C.

Polyethylene H: Polyethylene H is a PE3-type polyethylene made according to U.S. Pat. No. 6,956,088 using the bis(n-propylcyclopentadienyl)HfCl$_2$/MAO catalyst system under polymerization conditions to produce an ethylene-based polymer having a density of 0.917 g/cm$^3$, a melt index ($I_{2.16}$) of 0.90 g/10 min, a melt index ratio ($I_{21.6}/I_{2.16}$) of 24.4. Polyethylene H has a first peak corresponding to a log($M_w$) value of about 4.4 that appears at a TREF elution temperature of 91.0° C. and a second peak at a log($M_w$) value of 5.1 and a TREF elution temperature of 62.0° C.

Polyethylene I: Polyethylene I is a low density polyethylene (i.e., a PE4-type Polyethylene) having a melt index ($I_{2.16}$) of 0.20 g/10 min, a melt index ratio ($I_{21.6}/I_{2.16}$) of 90, a $M_w/M_n$ of 6.8, and a density of 0.923 g/cm$^3$ made by high pressure polymerization and available from ExxonMobil Chemical Company as LD166.

Example 1

A 1.25 mil (31.25 μm) film comprising Polyethylene D (VPR 18H07BAX) is made using a Gloucester blown film line operated at a die-throughput rate of 12 lbs/hr-inch (2.15 kg/hr-cm) of die, a Blow-Up Ratio (BUR) of 1.5 and a frost line height of 31 inches (79 cm). The film had an MD Elmendorf Tear of 672 g/mil (26.88 g/μm).

Example 2(PE1-type Skins and PE2/PE1 Blend Core)

A coextruded blown three-layer film is formed on a W&H film blowing line at a BUR of 2.5 a die diameter of 250 mm, a die gap of 1.4 mm, a Haul-off speed of about 103 m/min. The extruders forming Layers B and C are set at a temperature of 190° C. and the extruder forming Layer A is operated at 200° C. The resulting film has a thickness of 25.0 μm and a layer distribution B/A/C of 1/2/1 (6.25/12.5/6.25 μm). The film has an inner Layer A comprising 78.4 wt. % Polyethylene C (Exceed™ 1018 mPE), 20.0 wt. % Polyethylene A (Enable™ 27-03 mPE), and 1.6 wt. % MB42 (anti-gel masterbatch) interposing Layers B and C comprising Polyethylene C.

Example 3(Comparative)(PE1-type Skins and PE2/PE4 Blend Core)

A coextruded blown film wherein Polyethylene A of Layer A is replaced by the LDPE Polyethylene I is formed under substantially the same conditions as Example 2. Example 3 has a Layer A comprising 78.4 wt. % Polyethylene C (Exceed™ 1018 mPE), 20.0 wt. % Polyethylene I (LD166), and 1.6 wt. % MB42 (anti-gel masterbatch) interposing Layers B and C comprising Polyethylene C is formed. The resulting film has a thickness of 25.0 μm and a layer distribution B/A/C of 1/2/1 (6.25/12.5/6.25 μm).

Example 4(PE1-type Skins and PE1/PE1 Blend Core)

A coextruded blown three-film is formed on a W&H film blowing line at a BUR of 2.5 a die diameter of 250 mm, a die gap of 1.4 mm, a Haul-off speed of about 103 m/min. The extruders forming Layers B and C are set at a temperature of 180° C. and the extruder forming Layer A is operated at 180° C. The film has an inner Layer A comprising 78.4 wt. % Polyethylene B (Enable™ 20-10 mPE), 20.0 wt. % Polyethylene A (Enable™ 27-03 mPE), and 1.6 wt. % MB42 (anti-gel masterbatch) interposing Layers B and C each of which comprises Polyethylene B (Enable™ 20-10 mPE). The resulting film has a thickness of 25.0 μm and a layer distribution B/A/C of 1/2/1 (6.25/12.5/6.25 μm).

Example 5 (Comparative)(PE1-type Skins and PE1/PE4 Blend Core)

A coextruded blown film wherein Polyethylene A (Enable™ 27-03 mPE) of Layer A is replaced by the LDPE Polyethylene I (LD166) is formed under substantially the same conditions as Example 2. Thus, Example 5 has a Layer A comprising 78.4 wt. % Polyethylene B (Enable™ 20-10 mPE), 20.0 wt. % Polyethylene I (LD166), and 1.6 wt. % MB42 (anti-gel masterbatch) interposing Layers B and C comprising Polyethylene B is formed. The resulting film has a thickness of 25.0 μm and a layer distribution B/A/C of 1/2/1 (6.25/12.5/6.25 μm).

Example 6(PE3-type Skins and PE3/PE1 Blend Core)

A coextruded blown three-film is formed on a W&H film blowing line at a BUR of 2.5 a die diameter of 250 mm, a die gap of 1.4 mm, a Haul-off speed of about 103 m/min. The extruders forming Layers B and C are set at a temperature of 190° C. and the extruder forming Layer A is operated at 190° C. The film has an inner Layer A comprising 78.4 wt. % Polyethylene D (eVPR), 20.0 wt. % Polyethylene A (Enable™ 27-03 mPE), and 1.6 wt. % MB42 (anti-gel masterbatch) interposing Layers B and C each of which comprises Polyethylene D (eVPR). The resulting film has a thickness of 25.0 μm and a layer distribution B/A/C of 1/2/1 (6.25/12.5/6.25 μm).

Example 7(PE3-type Skins and PE3/PE4 Blend Core)

A coextruded blown film, wherein Polyethylene D (eVPR) of Layer A is replaced by the LDPE Polyethylene I (LD166), is formed under substantially the same conditions as Example 2. Thus, Example 7 has an inner Layer A comprising 78.4 wt. % Polyethylene D (eVPR), 20.0 wt. % Polyethylene I (LD166) and 1.6 wt. % MB42 (anti-gel masterbatch) interposing Layers B and C comprising Polyethylene D (eVPR) is formed. The resulting film has a thickness of 25.0 μm and a layer distribution B/A/C of 1/2/1 (6.25/12.5/6.25 μm).

Properties of the Exemplary films are reported in Table 1.

TABLE 1

| Film Properties | | | | | | |
|---|---|---|---|---|---|---|
| | Example | | | | | |
| | 2 | 3 | 4 | 5 | 6 | 7 |
| Gauge, μm | 25.0 | 25.0 | 25.0 | 25.0 | 25.0 | 25.0 |
| Elmendorf Tear | | | | | | |
| MD, g | 257 | 230 | 130 | 67.5 | 190 | 90 |
| MD, g/μm | 10.3 | 9.2 | 5.2 | 2.7 | 7.6 | 3.6 |
| % change from reference | 12 | Ref. | 93 | Ref. | 109 | Ref. |
| Dart Drop, g | 1410 | 756.7 | 311.4 | 185.0 | 863.6 | 481.7 |
| g/μm | 58.8 | 28 | 12.0 | 7.1 | 34.6 | 17.8 |
| % change from reference | +110 | Ref. | +69 | Ref. | +94 | Ref. |
| Zehntner 45° Gloss | | | | | | |
| Average of 5 | 88.6 | 92.2 | 52.5 | 68.7 | 43.5 | 68.5 |
| % change from reference | −4 | Ref. | −24 | Ref. | −36 | Ref. |
| Haze, % | 2.7 | 1.9 | 7.1 | 6.6 | 14.0 | 6.8 |
| % change from reference | +45 | Ref | +8 | Ref | +106.0 | Ref |
| Clarity, % | | | | | | |
| Average of 5 | 86 | 77 | 75 | 80 | 63 | 70 |
| % change from reference | +12 | Ref | −6 | Ref | −10 | Ref |

The table clearly shows the significantly higher Dart A impact resistance for the film structures based on each of the PE1 to PE3-type platforms upon inclusion of the PE1-type polyethylene having a higher density and lower melt index than the other resin in the core Layer A. Moreover, for the film having PE3-type skins with the PE3/PE1 core, both Dart and MD Tear improve. For the film having PE1 skins and a blend of two different PE1-type polyethylenes, Dart as well as MD and TD Tear improve.

Certain features of the present invention are described in terms of a set of numerical upper limits and a set of numerical lower limits. It should be appreciated that ranges from any lower limit to any upper limit are within the scope of the invention unless otherwise indicated.

All documents described herein are incorporated by reference herein, including any priority documents and/or testing procedures to the extent they are not inconsistent with this text, provided, however, that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa. In addition, the compositions, individual film layers and the overall film may be substantially free or essentially free (i.e., having less than 2.0 wt. % or less than 0.5 wt. %) of any additional component, additive, modifier, etc., not expressly recited.

What is claimed is:

1. A method of improving the MD Elmendorf Tear strength of a co-extruded, blown multilayer film, the method comprising:
   a) providing a first layer comprising:
      i) 5.0 wt % to 35.0 wt % of a first polyethylene having a $g'_{vis}$ of ≤0.97, 0.05 long-chain branches per 1,000 carbon atoms to 0.5 long-chain branches per 1,000 carbon atoms, a density of 0.920 to 0.935 g/cm$^3$, and a melt index of 0.1 g/10 min to 0.5 g/10 min; and
      ii) 95.0 wt % to 65.0 wt % of a second polyethylene having a hafnium : zirconium (ppm/ppm) ratio of ≥1.0, a CDBI of <50%, and a $g'_{vis}$ of ≥0.98, wherein the wt % values are based on the total weight of the first layer, wherein:
         the density of the first polyethylene is greater than a density of the second polyethylene,
         the melt index of the first polyethylene is less than a melt index of the second polyethylene, or
         the density of the first polyethylene is greater than a density of the second polyethylene and the melt index of the first polyethylene is less than a melt index of the second polyethylene;
   b) providing a second layer in surface contact with a first surface of the first layer, the second layer comprising:
      i) 80.0 wt % to 100.0 wt % of a third polyethylene, wherein the third polyethylene has a hafnium:zirconium (ppm/ppm) ratio of greater than 1.0, a CDBI of <50%, and a $g'_{vis}$ of ≥0.98; and ii) 0.0 wt % to 20.0 wt % of a fourth polyethylene, wherein the wt % values are based on the total weight of the second layer;

c) providing a third layer in surface contact with a second surface of the first layer, the third layer comprising:
   i) 80.0 wt % to 100.0 wt % of a fifth polyethylene, wherein the fifth polyethylene has a hafnium : zirconium (ppm/ppm) ratio of greater than 1.0, a CDBI of <50%, and a $g'_{vis}$ of ≥0.98; and
   ii) 0.0 wt % to 20.0 wt % of a sixth polyethylene, wherein the wt % values are based on the total weight of the third layer;

wherein each of the third polyethylene, the fourth polyethylene, the fifth polyethylene, and the sixth polyethylene may be the same or different.

2. The method of claim 1, wherein the second polyethylene has at least a first peak and a second peak in a comonomer distribution analysis, wherein the first peak has a maximum at a $\log(M_w)$ value of 4.0 to 5.4 and a TREF elution temperature of 70.0° C. to 100.0° C. and the second peak has a maximum at a $\log(M_w)$ value of 5.0 to 6.0 and a TREF elution temperature of 40.0° C. to 70.0° C.

3. The method of claim 1, wherein the second polyethylene has at least one property selected from the group consisting of:
   a melt index of 0.1 g/10 min to 5.0 g/10 min,
   a melt index ratio of 20 to 40,
   a Mw of 20,000 g/mol to 200,000 g/mol,
   a Mw/Mn of 2.0 to 4.5, and
   a density of 0.910 g/cm$^3$ to 0.925 g/cm$_3$.

4. The method of claim 1, wherein the film has a MD Elmendorf Tear of about 500.0 g/mil to about 1,000.0 g/mil.

5. The method of claim 1, wherein the density of the first polyethylene is greater than a density of the second polyethylene.

6. The method of claim 1, wherein the second polyethylene has a melt index of 0.6 g/10 min to 5 g/10 min.

7. The method of claim 1, wherein the density of the first polyethylene is greater than a density of the second polyethylene, and wherein the second polyethylene has a melt index of 0.6 g/10 min to 5 g/10 min.

8. The method of claim 1, wherein the second polyethylene has:
   a melt index of 0.6 g/10 min to 5.0 g/10 min,
   a melt index ratio of 20 to 40,
   a Mw of 20,000 g/mol to 200,000 g/mol,
   a Mw/Mn of 2.0 to 4.5, and
   a density of 0.910 g/cm$^3$ to 0.925 g/cm$^3$.

9. The method of claim 1, wherein the density of the first polyethylene is greater than a density of the second polyethylene, and wherein the second polyethylene has:
   a melt index of 0.6 g/10 min to 5.0 g/10min,
   a melt index ratio of 20 to 40,
   a Mw of 20,000 g/mol to 200,000 g/mol,
   a Mw/Mn of 2.0 to 4.5, and
   a density of 0.910 g/cm$^3$ to 0.925 g/cm$_3$.

10. The method of claim 1, wherein the second polyethylene has at least a first peak and a second peak in a comonomer distribution analysis, wherein the first peak has a maximum at a $\log(M_w)$ value of 4.0 to 5.4 and a TREF elution temperature of 70.0° C. to 100.0° C. and the second peak has a maximum at a $\log(M_w)$ value of 5.0 to 6.0 and a TREF elution temperature of 40.0° C. to 60.0° C.

11. The method of claim 1, wherein the second polyethylene has at least a first peak and a second peak in a comonomer distribution analysis, wherein the first peak has a maximum at a $\log(M_w)$ value of 4.3 to 5.0 and a TREF elution temperature of 80.0° C. to 95.0° C. and the second peak has a maximum at a $\log(M_w)$ value of 5.3 to 5.7 and a TREF elution temperature of 45.0° C. to 60.0° C.

12. The method of claim 1, wherein the second polyethylene has at least a first peak and a second peak in a comonomer distribution analysis, wherein the first peak has a maximum at a $\log(M_w)$ value of 4.5 to 4.7 and a TREF elution temperature of 85.0° C. to 90.0° C. and the second peak has a maximum at a $\log(M_w)$ value of 5.4 to 5.6 and a TREF elution temperature of 48.0° C. to 54.0° C.

13. The method of claim 1, wherein:
the density of the first polyethylene is greater than a density of the second polyethylene, and wherein the second polyethylene has:
   a melt index of 0.6 g/10 min to 5.0 g/10 min,
   a melt index ratio of 20 to 40,
   a Mw of 20,000 g/mol to 200,000 g/mol,
   a Mw/Mn of 2.0 to 4.5,
   at least a first peak and a second peak in a comonomer distribution analysis, wherein the first peak has a maximum at a $\log(M_w)$ value of 4.5 to 4.7 and a TREF elution temperature of 85.0° C. to 90.0° C. and the second peak has a maximum at a $\log(M_w)$ value of 5.4 to 5.6 and a TREF elution temperature of 48.0° C. to 54.0° C.

14. A method for making a film having a thickness of about 20.0 µm to about 100.0 µm, the method comprising:
a) providing a Layer A comprising:
   i) about 5.0 wt % to about 35.0 wt % of a first polyethylene having a $g'_{vis}$ of ≤0.97, 0.05 long-chain branches per 1,000 carbon atoms to 0.5 long-chain branches per 1,000 carbon atoms, a density of 0.920 g/cm$^3$ to 0.935 g/cm$^3$, and a melt index of 0.1 g/10 min to 0.5 g/10 min; and
   ii) 95.0 wt % to 65.0 wt % of a second polyethylene comprising ≥50.0 wt % of polymer units derived from ethylene and ≤50.0 wt % of polymer units derived from a $C_3$ to $C_{20}$ comonomer, based on the weight of the second polyethylene, wherein the second polyethylene has a CDBI of ≥60%, and a $g'_{vis}$ of ≥0.98; wherein the wt % values are based on the total weight of Layer A, and wherein:
      the density of the first polyethylene is greater than a density of the second polyethylene,
      the melt index of the first polyethylene is less than a melt index of the second polyethylene, or
      the density of the first polyethylene is greater than a density of the second polyethylene and the melt index of the first polyethylene is less than a melt index of the second polyethylene, b) providing a Layer B in surface contact with a first surface of Layer A, the Layer B comprising:
   i) 80.0 wt % to 100.0 wt % of a third polyethylene, wherein the third polyethylene comprises ≥50.0 wt % of polymer units derived from ethylene and ≤50.0 wt % of polymer units derived from a $C_3$ to $C_{20}$ comonomer, based on the weight of the third polyethylene, wherein the third polyethylene has a CDBI of ≥60%, a density of 0.910 g/cm$^3$ to 0.950 g/cm$^3$, and a $g'_{vis}$ of >0.98; and
   ii) 0.0 wt % to 20.0 wt % of a fourth polyethylene, wherein the wt % values are based on the total weight of the Layer B; and c) providing a Layer C in surface contact with a second surface of Layer A, the Layer C comprising:
   i) 80.0 wt % to 100.0 wt % of a fifth polyethylene, wherein the fifth polyethylene comprises ≥50.0 wt % of polymer units derived from ethylene and ≤50.0 wt % polymer units derived from a $C_3$ to $C_{20}$ comonomer, based on the weight of the fifth polyethylene, and wherein the fifth polyethylene has a CDBI of ≥60%, a density of 0.910 g/cm³ to 0.950 g/cm³ and a $g'_{vis}$ of >0.98; and 0.0 wt % to 20.0 wt % of a sixth polyethylene, wherein the wt % values are based on the total weight of the Layer C;

wherein each of the third polyethylene, the fourth polyethylene, the fifth polyethylene, and the sixth polyethylene may be the same or different.

15. The method of claim 14, wherein the second polyethylene has a melt index of 0.8 g/10 min to 1.5 g/10 min.

16. The method of claim 4, wherein the second polyethylene has a density of 0.910 g/cm³ to 0.925 g/cm³.

17. The method of claim 14, wherein the film has an MD Elmendorf Tear of about 500.0 g/mil to about 1,000.0 g/mil.

18. The method of claim 14, wherein the density of the first polyethylene is greater than a density of the second polyethylene.

19. The method of claim 14, wherein the melt index of the first polyethylene is less than a melt index of the second polyethylene.

20. The method of claim 14, wherein the density of the first polyethylene is greater than a density of the second polyethylene and the melt index of the first polyethylene is less than a melt index of the second polyethylene.

* * * * *